Oct. 19, 1954 I. MOLNAR 2,692,378

SPACE RESERVATION

Filed June 30, 1953 10 Sheets-Sheet 1

INVENTOR.
IMRE MOLNAR

BY Mc Walter Owen

ATTY.

Oct. 19, 1954 I. MOLNAR 2,692,378

SPACE RESERVATION

Filed June 30, 1953 10 Sheets-Sheet 2

INVENTOR.
IMRE MOLNAR
BY Mc Walter Owen
ATTY.

Oct. 19, 1954 I. MOLNAR 2,692,378

SPACE RESERVATION

Filed June 30, 1953 10 Sheets-Sheet 3

INVENTOR.
IMRE MOLNAR

BY McWalter Owen

ATTY.

*INVENTOR.*
IMRE MOLNAR
*BY* Wm. Walter Owen
ATTY.

INVENTOR.
IMRE MOLNAR
BY Wm. Walter Owen
ATTY.

DAY OF TRANSMISSION (2 WEEK PERIOD)

ONE TRANSMISSION CYCLE

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | MO1 | TU1 | WE1 | TH1 | FR1 | SA1 | SU1 | MO2 | TU2 | WE2 | TH2 | FR2 | SA2 | SU2 |
| 2 | SU1 | MO2 | TU2 | WE2 | TH2 | FR2 | SA2 | SU2 | MO1 | TU1 | WE1 | TH1 | FR1 | SA1 |
| 3 | TU1 | WE1 | TH1 | FR1 | SA1 | SU1 | MO2 | TU2 | WE2 | TH2 | FR2 | SA2 | SU2 | MO1 |
| 4 | WE1 | TH1 | FR1 | SA1 | SU1 | MO2 | TU2 | WE2 | TH2 | FR2 | SA2 | SU2 | MO1 | TU1 |
| 5 | TH1 | FR1 | SA1 | SU1 | MO2 | TU2 | WE2 | TH2 | FR2 | SA2 | SU2 | MO1 | TU1 | WE1 |
| 6 | MO1 | TU1 | WE1 | TH1 | FR1 | SA1 | SU1 | MO2 | TU2 | WE2 | TH2 | FR2 | SA2 | SU2 |
| 7 | MO2 | TU2 | WE2 | TH2 | FR2 | SA2 | SU2 | MO1 | TU1 | WE1 | TH1 | FR1 | SA1 | SU1 |
| 8 | TU1 | WE1 | TH1 | FR1 | SA1 | SU1 | MO2 | TU2 | WE2 | TH2 | FR2 | SA2 | SU2 | MO1 |
| 9 | FR1 | SA1 | SU1 | MO2 | TU2 | WE2 | TH2 | FR2 | SA2 | SU2 | MO1 | TU1 | WE1 | TH1 |
| 10 | TU2 | WE2 | TH2 | FR2 | SA2 | SU2 | MO1 | TU1 | WE1 | TH1 | FR1 | SA1 | SU1 | MO2 |
| 11 | MO1 | TU1 | WE1 | TH1 | FR1 | SA1 | SU1 | MO2 | TU2 | WE2 | TH2 | FR2 | SA2 | SU2 |
| 12 | WE1 | TH1 | FR1 | SA1 | SU1 | MO2 | TU2 | WE2 | TH2 | FR2 | SA2 | SU2 | MO1 | TU1 |
| 13 | TH1 | FR1 | SA1 | SU1 | MO2 | TU2 | WE2 | TH2 | FR2 | SA2 | SU2 | MO1 | TU1 | WE1 |
| 14 | TU1 | WE1 | TH1 | FR1 | SA1 | SU1 | MO2 | TU2 | WE2 | TH2 | FR2 | SA2 | SU2 | MO1 |
| 15 | WE2 | TH2 | FR2 | SA2 | SU2 | MO1 | TU1 | WE1 | TH1 | FR1 | SA1 | SU1 | MO2 | TU2 |
| 16 | SA1 | SU1 | MO2 | TU2 | WE2 | TH2 | FR2 | SA2 | SU2 | MO1 | TU1 | WE1 | TH1 | FR1 |
| 17 | MO1 | TU1 | WE1 | TH1 | FR1 | SA1 | SU1 | MO2 | TU2 | WE2 | TH2 | FR2 | SA2 | SU2 |
| 18 | TH2 | FR2 | SA2 | SU2 | MO1 | TU1 | WE1 | TH1 | FR1 | SA1 | SU1 | MO2 | TU2 | WE2 |
| 19 | TU1 | WE1 | TH1 | FR1 | SA1 | SU1 | MO2 | TU2 | WE2 | TH2 | FR2 | SA2 | SU2 | MO1 |
| 20 | WE1 | TH1 | FR1 | SA1 | SU1 | MO2 | TU2 | WE2 | TH2 | FR2 | SA2 | SU2 | MO1 | TU1 |
| 21 | TH1 | FR1 | SA1 | SU1 | MO2 | TU2 | WE2 | TH2 | FR2 | SA2 | SU2 | MO1 | TU1 | WE1 |
| 22 | MO1 | TU1 | WE1 | TH1 | FR1 | SA1 | SU1 | MO2 | TU2 | WE2 | TH2 | FR2 | SA2 | SU2 |
| 23 | FR2 | SA2 | SU2 | MO1 | TU1 | WE1 | TH1 | FR1 | SA1 | SU1 | MO2 | TU2 | WE2 | TH2 |
| 24 | TU1 | WE1 | TH1 | FR1 | SA1 | SU1 | MO2 | TU2 | WE2 | TH2 | FR2 | SA2 | SU2 | MO1 |
| 25 | FR1 | SA1 | SU1 | MO2 | TU2 | WE2 | TH2 | FR2 | SA2 | SU2 | MO1 | TU1 | WE1 | TH1 |
| 26 | SA2 | SU2 | MO1 | TU1 | WE1 | TH1 | FR1 | SA1 | SU1 | MO2 | TU2 | WE2 | TH2 | FR2 |
| 27 | MO1 | TU1 | WE1 | TH1 | FR1 | SA1 | SU1 | MO2 | TU2 | WE2 | TH2 | FR2 | SA2 | SU2 |
| 28 | WE1 | TH1 | FR1 | SA1 | SU1 | MO2 | TU2 | WE2 | TH2 | FR2 | SA2 | SU2 | MO1 | TU1 |
| 29 | TH1 | FR1 | SA1 | SU1 | MO2 | TU2 | WE2 | TH2 | FR2 | SA2 | SU2 | MO1 | TU1 | WE1 |
| 30 | TU1 | WE1 | TH1 | FR1 | SA1 | SU1 | MO2 | TU2 | WE2 | TH2 | FR2 | SA2 | SU2 | MO1 |
| 31 | SU2 | MO1 | TU1 | WE1 | TH1 | FR1 | SA1 | SU2 | MO2 | TU2 | WE2 | TH2 | FR2 | SA2 |
| 32 | SA1 | SU1 | MO2 | TU2 | WE2 | TH2 | FR2 | SA2 | SU2 | MO1 | TU1 | WE1 | TH1 | FR1 |

FIG. 6

INVENTOR.
IMRE MOLNAR
BY [signature]
ATTY.

INVENTOR.
IMRE MOLNAR
BY [signature]
ATTY.

Oct. 19, 1954

I. MOLNAR

SPACE RESERVATION 2,692,378

Filed June 30, 1953

10 Sheets-Sheet 8

INVENTOR.
IMRE MOLNAR
BY Wm. Walter Overw.
ATTY.

INVENTOR.
IMRE MOLNAR
BY Wm. Walter Owen
ATTY.

FIG. 10

| | | | | |
|---|---|---|---|---|
| CGMODMOH | CVTLCGOHHXGI | NQDVSLRPSZ | SF | SLBEPOPDSA |
| 101 E E D | 103 D D T T O | T T O O D | E | 105 E E D E |
| DVOGSZSF | PGCVCG | WATLSNCGMODM | OH | NKAXCVTLCG |
| 109 E E E | 111 T O | 115 D D D T O | O | 117 |
| NKXACTDOCGIX | OHDVSLELRP | SZOASF | LGPGCVMKDMOH | DVRTSLRPSF |
| 119 E E E DO | O T D D D | D D T | 127 D D D D E | T D T D T |
| NKDOSNCGOHHX | DV | LGPGAXCVTLCG | MODMOHCXSL | ELSF |
| 129 D D T T T | D | 133 T T O O O | T T T D E | E E |
| LGPGDOCGOHDV | BEPOPDSAVR | NKXACTAXCVSN | CGMODMOH | PGCVCG |
| 135 D D D D D | D T T D E | 137 E E E D D | T T T E | 139 D T |
| NKCVTLMKOHDV | SLRPSZOASF | LGPGAXDOCGOH | DVSLBEPOWL | SM |
| 143 E E D D E | E D T T T | 147 T T D E D | D D E E E | E |
| NKXACV | BWHTCVCG | LGPGCVCGOHDV | SLGGBEPOPD | SAVR |
| 201 E E | 203 D D D | 209 E D E D D | D D E D D | D D |
| WATLCG | LGPGCV | DVLASQ | DVEJLQLASQ | DVEJLQLASQ |
| 205 D D | 211 D D | 401 T T | 407 O O T T | 415 O O D D |
| DVLA | LGCGCXSF | CGDVBEPDSAVR | LGPGDOCGOHDV | SF |
| 419 T | 501 T O O | 505 D E E E E | 507 E D D T O | O |
| LGCG | LGCVCGDV | WACGDVOASF | LGCG | LGCV |
| 511 D | 515 D D T | 517 O O T D | 519 E | 521 D |
| BWHTCVCGCXSF | CGSLPDSAVR | LGCG | LGSF | LGCGSF |
| 523 D D D D D. | 525 T T D E | 527 T | 601 O | 603 D T |

INVENTOR.
IMRE MOLNAR
BY Wm. Walter Owen
ATTY.

Patented Oct. 19, 1954

2,692,378

UNITED STATES PATENT OFFICE 2,692,378

SPACE RESERVATION

Imre Molnar, Chicago, Ill., assignor to Automatic Electric Laboratories, Inc., Chicago, Ill., a corporation of Delaware Application June 30, 1953, Serial No. 365,123

14 Claims. (Cl. 340—153)

The invention relates in general to space reservation systems and more particularly to a system for automatically printing space reservation information bulletins covering a two-week period to indicate the number of available spaces, or seats, on each of a large plurality of scheduled transportation routes, or flights of airplanes, trains, or the like.

The principal object of the invention is to provide an improved space reservation system of the above mentioned character.

Another object is the provision of means for causing code letters, designating differing available spaces, or seats, to be printed on partially preprinted bulletins in the proper locations corresponding to the different routes and the various stopping points enroute for such routes.

A feature of the invention relates to the code marking of each space computer indicator, which is individual to each leg, or section, of a route, in accordance with the number of available seats remaining for that particular section of the route.

A further feature relates to the means whereby code markings on the individual space indicators are successively read, or scanned, in the proper order to control a common coding control means which transmits over a broadcast teletypewriter circuit to cause teleprinters connected to this broadcast circuit to print corresponding code letters on the partially preprinted bulletins in the proper locations corresponding to the respective route, or flight, legs. These preprinted bulletins containing the route numbers, and the two letter codes of all stations, or legs, touched by a route.

Another feature of the invention relates to the periodic scanning of the space indicator circuits and the arrangement whereby the scheduled routes for the current day of the week and the earlier days of a following two-week period are broadcast at more frequent intervals than are the scheduled routes for the later days of the two-week period. For example, the bulletin space information is broadcast for a fourteen day period and each bulletin contains all routes for this period in which the current, or present, day and the following day's available space information is broadcast three times per hour, the second and third day's space information twice per hour, the fourth and fifth day's space information once per hour, the sixth and the remaining day's space information once every two hours.

Other features of the invention will become apparent upon perusal of the following description taken in conjunction with the accompanying drawings in which the present invention has been applied to a centralized space reservation system for an airplane transportation system.

Figs. 1 and 2 illustrate the detail circuit arrangements of the system.

Fig. 3 diagrammatically illustrates the space reservation system.

Fig. 4 diagrammatically illustrates the multiple connections between the scanning switches and the date switch.

Fig. 5 diagrammatically illustrates the grouping of the space indicators and their connections to the banks of the scanning switches.

Fig. 6 is a chart illustrating the order of access to the scanning switches as determined by the date switch.

Fig. 10 shows in part the printed bulletin with both the preprinted information and the code letters such as E, D, T and O which are printed in the proper places in accordance with this invention to indicate in code the available space in the respective routes, or flights.

*General description*

Figure 1:
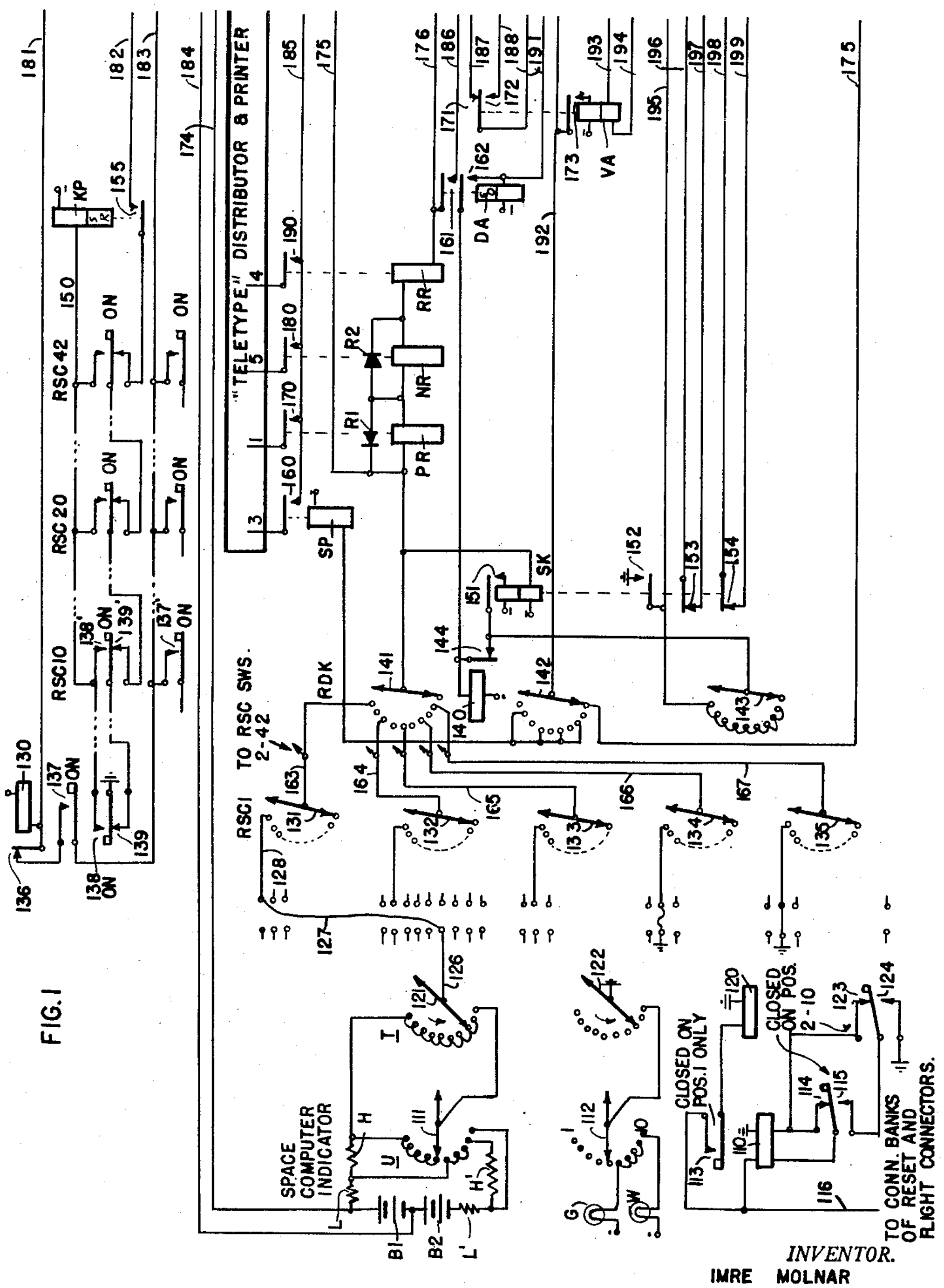

Briefly, the present invention illustrates a centralized space reservation system in which "Teletype" printers are controlled to print code letters on a preprinted bulletin sheet in accordance with the available space indicated on the flight space computer indicators.

The preprinted information on the preprinted bulletin sheet comprises the flight number and two-letter city abbreviations designating the originating, intermediate and destination stopping points in a flight, or route.

There is a space computer indicator, comprising a tens and units switch, for each sector, or leg, of the flight. That is, a flight originating in Chicago with stops in Pittsburgh and Philadelphia and terminating in New York would have three indicators. The first indicator corresponding to the first sector, or leg, for the Chicago to Pittsburgh portion of the flight, the second indicator corresponding to the second sector, or leg, for the Pittsburgh to Philadelphia portion of the flight, and the third indicator corresponding to the third sector, or leg, for the Philadelphia to New York portion of the flight. These space indicators are operated in the same manner as described in the Molnar application Ser. No. 68,273, filed December 30, 1948, now Patent No. 2,647,249, dated July 28, 1953, to count by subtraction the number of reservations for each sector of each flight. Each space computer indicator is wired to give four different battery potential and resistance value markings, dependent upon the number of available space reservations left. These battery potential markings are periodically picked up by the scanning switches which control relays to cause the "Teletype" printer to print in code letters the available space in the flight sectors, or legs, on a preprinted bulletin sheet previously printed with the flight number and the city abbreviations designating the sectors of each flight, the available space code letters being printed directly below the city abbreviations representing the flight sectors. Each space indicator has a white lamp to indicate that no seats are available and a green lamp to indicate that one to four seats are available. When neither one of these lamps is illuminated it indicates that five or more seats are available.

There are forty-two RSC scanning switches each having five wipers and each wiper has access to forty-nine indicators. A 100-point switch ROD has fifteen wipers and levels, fourteen of which correspond to a two-week period, there being a wiper and a level for each day of the two-week period. The motor magnet circuit of each RSC scanning switch is connected and multipled in these fourteen levels of the ROD switch dependent upon its relation to the current day of the week. This multiplying, as will be explained more fully hereinafter, causes the printing of the available spaces for the flights of the current day of the week, as well as the next following day, to appear more frequently than the other days of the two-week period. Each different level of the ROD switch is activated by a manually hand operated switch which is moved by the attendant to select the level corresponding to the current day of the week.

The scanning switches RSC and the code reading switch RDK cause only one space computer indicator to be scanned at a time. Each indicator is so wired that different polarities and different resistance values are connected for the reading dependent upon the number of seats available. For example, with five or more seats available the reading is positive polarity and a high resistance value; with two to four seats available the reading is positive polarity and a low resistance value; with one seat available the reading is negative polarity with a high resistance value; and with no seats available the reading is negative polarity with a low resistance value. These readings are translated to cause the bulletins to be printed in the proper places with code letters corresponding to such readings.

Figure 3:
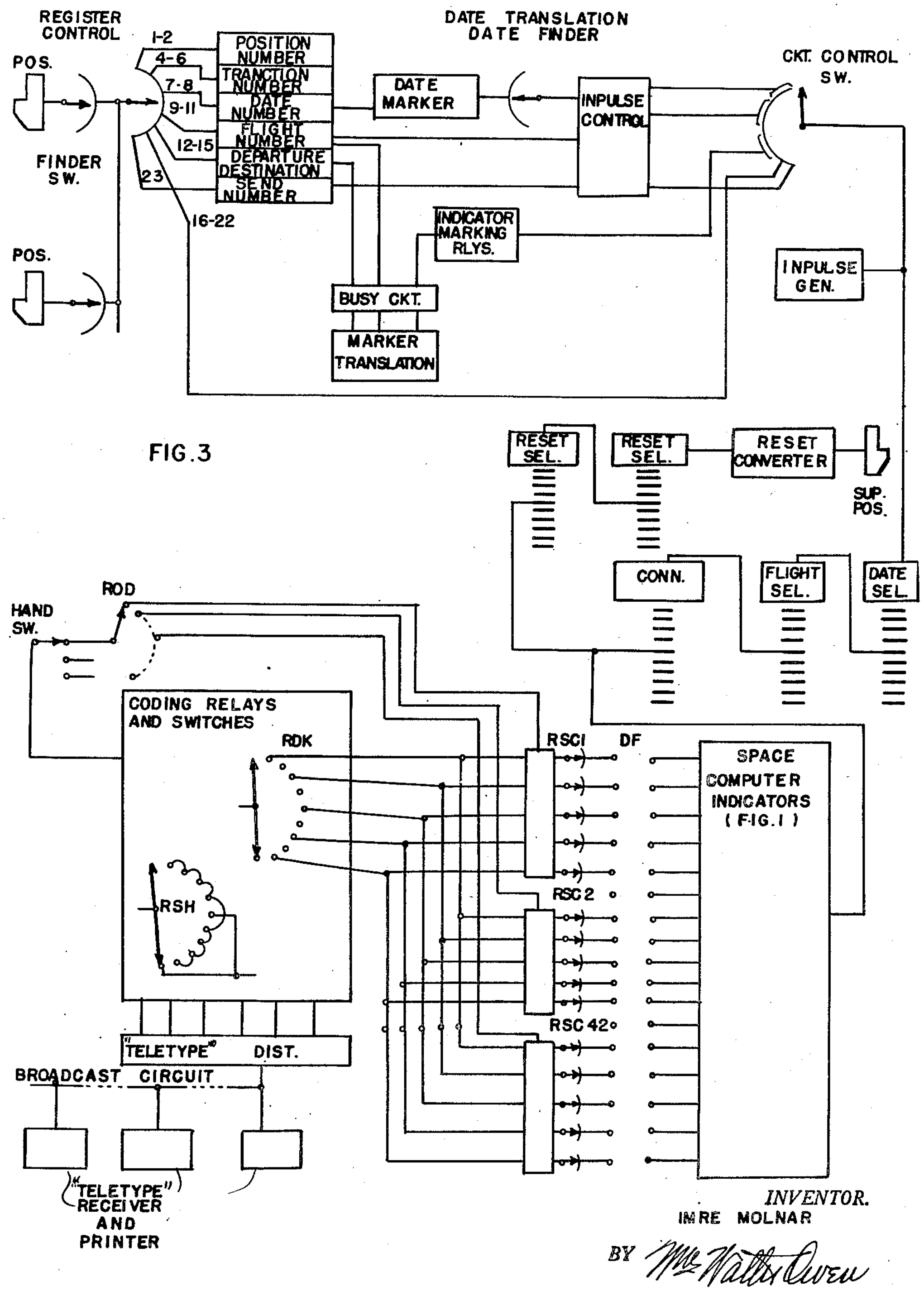

Fig. 3 is a schematic one-line diagram of the entire space reservation system including the apparatus of the Molnar patent mentioned above, for selecting, operating and resetting the space computing indicators and including the apparatus of the present invention for scanning, or reading, periodically the available space indications on the indicators in order to cause a "Teletype" printer to print bulletins in accordance with the space indications on the indicators. As disclosed in the same Molnar application a finder switch connects a reservation clerk's position to a local converter circuit which includes a register control switch, register relays, indicator marking relays, a date finder, a circuit control switch, an impulse generator, and an impulse control switch, and selector and connector switches for selecting the desired indicator. The portion of Fig. 3 representing the present invention includes the space computer indicators which are operated under control of the reservation operators, the scanning switches RSC which have access to the indicators by way of a distributing frame DF, the coding relays and switches RDK and RSH, the date switch ROD and hand switch, and the "Teletype" distributor and receiver-printers controlled thereby to print the bulletins periodically.

Referring now to Fig. 1, one of the space computer indicators is shown to the extreme left and comprises a units ten-point rotary switch U and a tens ten-point rotary switch T. The rotary switches have an upper set of bank contacts for connecting to a network of four resistances H, L, and H' and L', and a two-section battery B1 and B2, common to all indicators, connects a negative or positive potential through a high or low resistance to the scanning lead of this indicator. The neutral lead 184 of this battery is common to all the indicators and is connected through two poled and a marginal relay to the code reading switch RDK which has access to all the scanning switches RSC. It should be mentioned that another battery indicated by the usual ground and negative battery symbols is used for controlling the other relays and magnets. The lower set of bank contacts of switches U and T are provided to control a white lamp W and a green lamp G when only a few available spaces remain in the sector of flight corresponding to this indicator. The switch U has off normal contacts 113 which are closed in only the first position, off normal contacts 114 which are closed in positions two to ten, inclusive, off normal contacts 115 which are open in positions two to ten, and a double wound motor magnet 110 for stepping the wipers 111 and 112 on deenergization. The switch T has off normal contacts 123 which are closed in positions two to ten, contacts 124 which are open in positions two to ten and a motor magnet 120 for stepping wipers 121 and 122 on deenergization. The motor magnets 110 and 120 are controlled by impulses transmitted over conductor 116 which terminates in the banks of both the regular connector and reset connector shown and described in the Molnar patent mentioned above. There is one space computer indicator for each flight sector, or leg, of each flight.

The scanning lead 126 of each indicator terminates in a distributing frame DF where jumpers are run to connect such scanning leads to the proper bank contacts of the rotary type scanning switches RSC. In the present system there are forty-two scanning switches, one (RSC1) of which is shown while the remaining are indicated in the upper portion of this figure. Each scanning switch comprises five fifty-point bank contact sets and associated wipers, a motor magnet, such as magnet 130 for stepping the wipers on deenergization, and off-normal contacts 137, 138 and 139 shown in normal position. The wipers of each scanning switch normally rest in engagement with their fiftieth bank contacts which are left dead, or disconnected. The wipers 131 of all scanning switches are multipled to common conductor 163 which terminates in the first bank contact of the code reading switch RDK. In a similar manner the second to the fifth wipers of the scanning switches are multipled and connected to the bank contacts of switch RDK, as shown.

Figure 2:
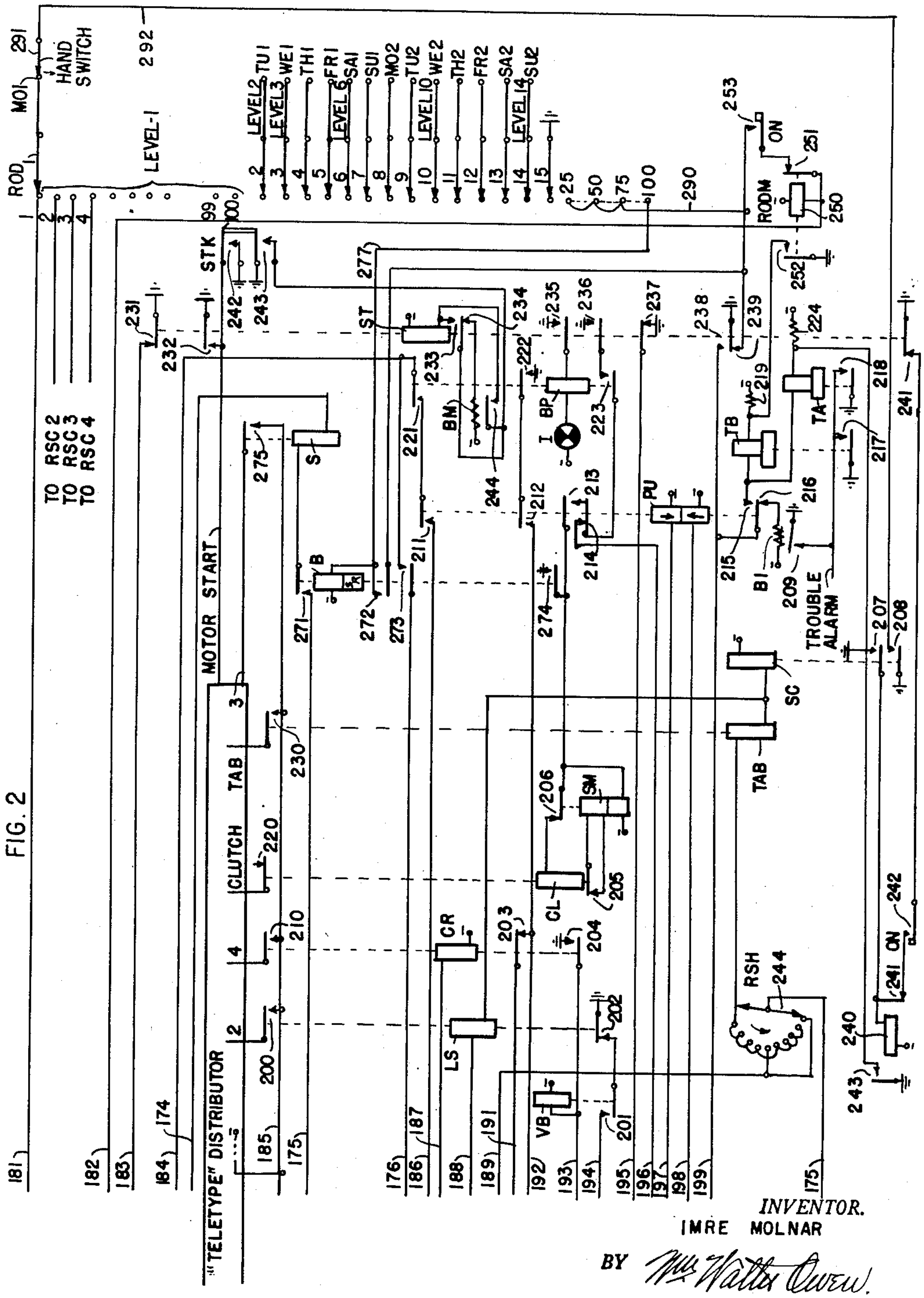

The common code reading switch RDK is a ten-point rotary switch which steps its wipers upon deenergization of its motor magnet 140 to connect with successive wipers of the scanning switch in use and to control the "Teletype" distributor diagrammatically shown in the upper portion of Figs. 1 and 2. The "Teletype" distributor is well known and is used to control a "Teleprinter" in a well known manner. A space relay SP and code relays PR, NR and RR are shown for transmitting space and code impulses to the "Teletype" distributor to control the "Teleprinter." In Fig. 2 line feed LS, carriage return CR, clutch CL, and tabulator TAB relays are shown for controlling the "Teletype" distributor in a well known manner.

In Fig. 2 the rotary switch RSH is a ten-point rotary switch having a motor magnet 240 for stepping wiper 244 on deenergization and off-normal contacts 242 which close when the switch steps off normal. Two thermo-relays B1 and BM have bi-metal contacts 209 and 244 which close after a predetermined energization of these relays. TA and TB indicate the well-known dash-pot type of relays which close their contacts 217 and 218 after a predetermined energization to ground the trouble alarm lead. A constantly rotating interrupter I controls the pulsing relay BP. A start key STK is manually operated by the operator to start the apparatus.

A date switch ROD is shown to the right of Fig. 2 having fifteen levels of bank contacts comprising one hundred bank contacts each and fifteen wipers. Fourteen of these wipers represent a two-week period with one level for each day of the two-week period. The fifteenth level is a space control level and the motor magnet 250 steps these wipers upon deenergization. It will be understood that smaller capacity switches with transfer control therebetween could be used instead of the large one hundred point capacity switches and this large capacity switch is used in this instance for simplicity. A manually operated hand switch 291 is shown to the extreme right of Fig. 2 and is operated by the operator to engage the wiper of the date ROD switch corresponding to the current day of the two-week period. That is, the hand switch 291 is manually moved to select, or activate, only one of the fourteen levels. The bank contacts of the fourteen levels of the date switch ROD are connected to the motor magnets of the scanning switches and are multipled in a manner indicated in Figs. 6, 7, 8 and 9.

Figure 4:
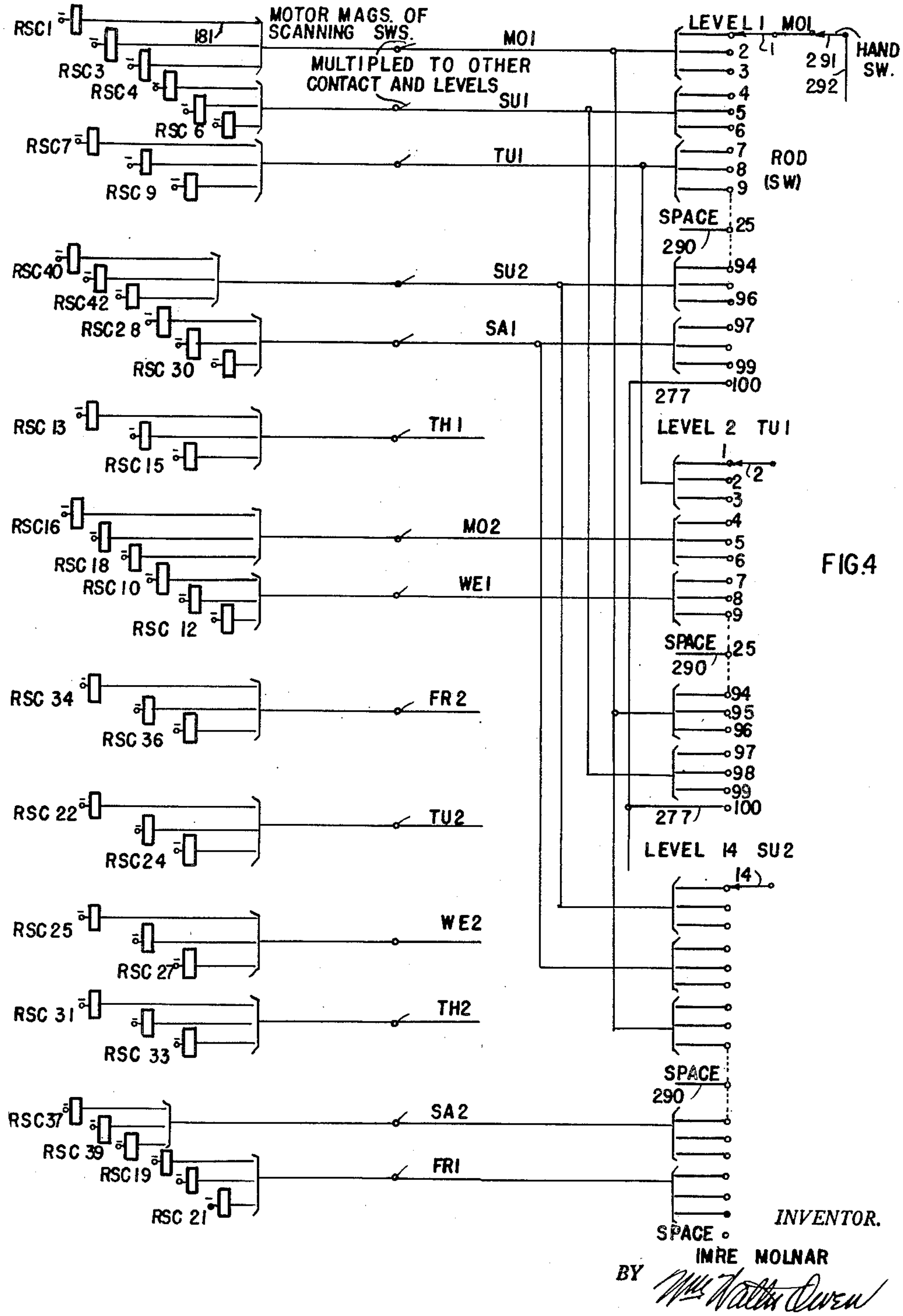

In Fig. 4 the motor magnets of all the scanning switches RSC are shown with a part of their multiple connections to the bank contacts of three of the fourteen levels of switch ROD, namely level 1 (Monday MO1), level 2 (Tuesday TU1) and level 14 (Sunday SU2).

Figure 5:
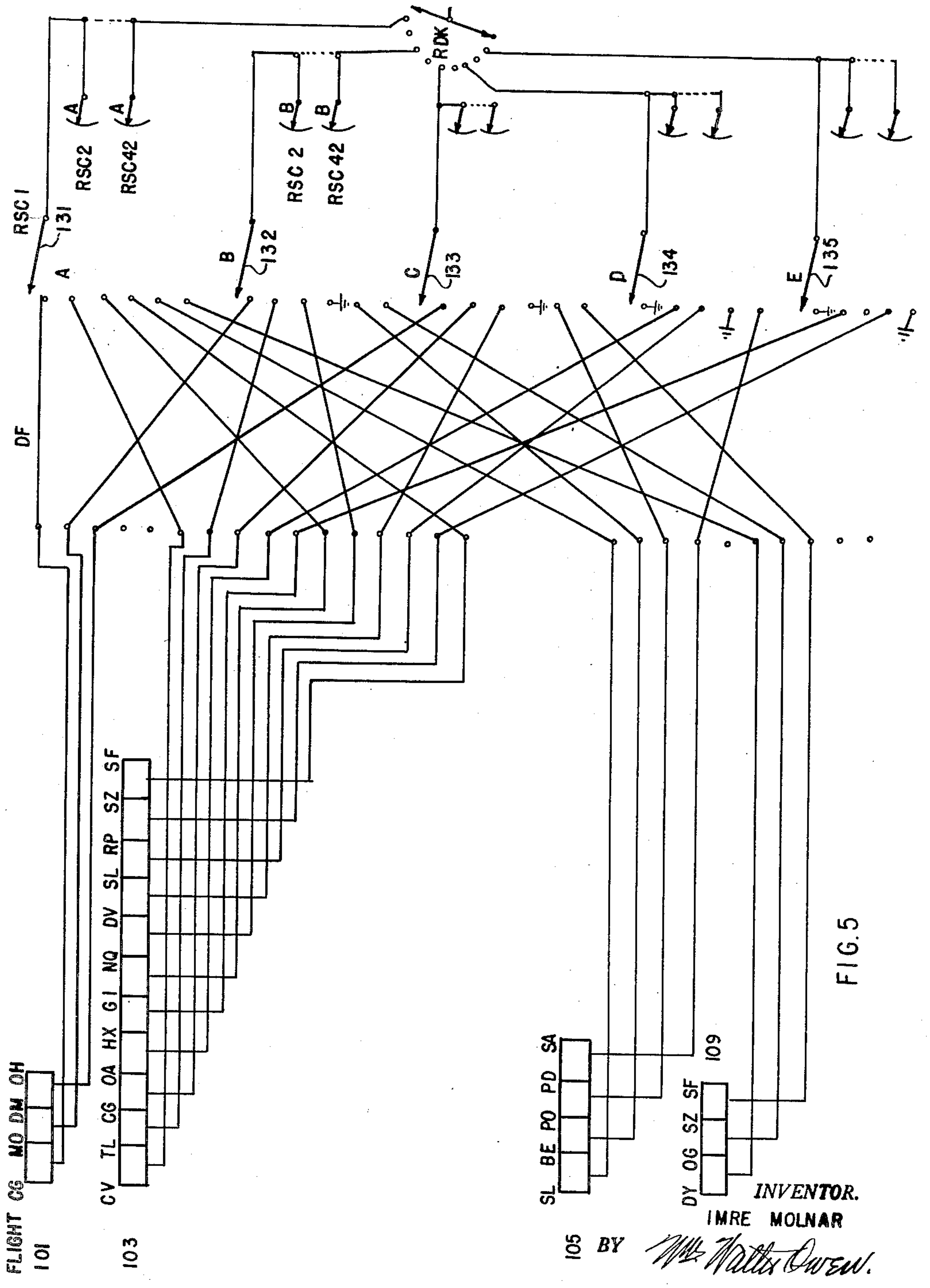

Fig. 5 shows the indicators for flights 101, 103, 105 and 109. Flight 101 originates in Chicago and ends in Omaha, the first sector, or leg, of this flight is from Chicago to Moline, the second sector is from Moline to Des Moines, and the last sector is from Des Moines to Omaha. Flight 103 is from Cleveland to San Francisco and includes eleven sectors, or legs, the first leg being from Cleveland to Toledo and the last leg being from Sacramento to San Francisco. Flight 105 is from St. Louis to Seattle comprising four sectors, or legs, and flight 109 is from Denver to San Francisco comprising only three legs, or sectors. Each sector, or leg, of each flight includes an indicator, such as shown by the switches U and T in Fig. 1, which are cross connected through the distributing frame DF to the bank contacts of the scanning switches RSC. As will be noted the first sector of flight 101 is connected to the first bank contact accessible to the A wiper 131, the second sector is connected to the first bank contacts accessible to the B wiper 132, and the third sector is connected to the first bank contact accessible to the C wiper 133. Since flight 101 comprises only three sectors the first bank contacts accessible to the D134 and E135 wipers are connected to ground. In a similar manner the first five sectors of flight 103 are connected to the second bank contacts accessible to wipers A, B, C, D, and E, the next five sectors are connected to the third bank contacts, and the last sector is connected to the fourth bank contact accessible to wiper A; the remaining fourth bank contacts being connected to ground. The other flight sectors are connected in a similar manner.

Fig. 6 is a chart showing the multiple connections within each level and between the fourteen levels of the ROD switch. The upper horizontal row numbered 1 to 14, inclusive, designates the fourteen levels of switch ROD, the first vertical column numbered 1 to 32, inclusive, designates the number of readings in one transmission cycle, and the second vertical column, beginning with MO1, indicates the multiplying within the level; that is, MO1 appears opposite the 1st, 6th, 11th, 17th, 22nd and 27th readings indicating six multiple connections in level 1. MO1 is likewise multipled between the various levels in accordance with the appearances of MO1 in these respective levels. In a similar manner the remaining designations, such as TU1, WE1, etc., are multipled. It should possibly be stated that MO1 stands for the current day of the two-week period which in this case is Monday, TU1 for the next day, or Tuesday, WE1 for Wednesday, and that MO2 stands for the following Monday, or a week from Monday MO1.

Figure 7:
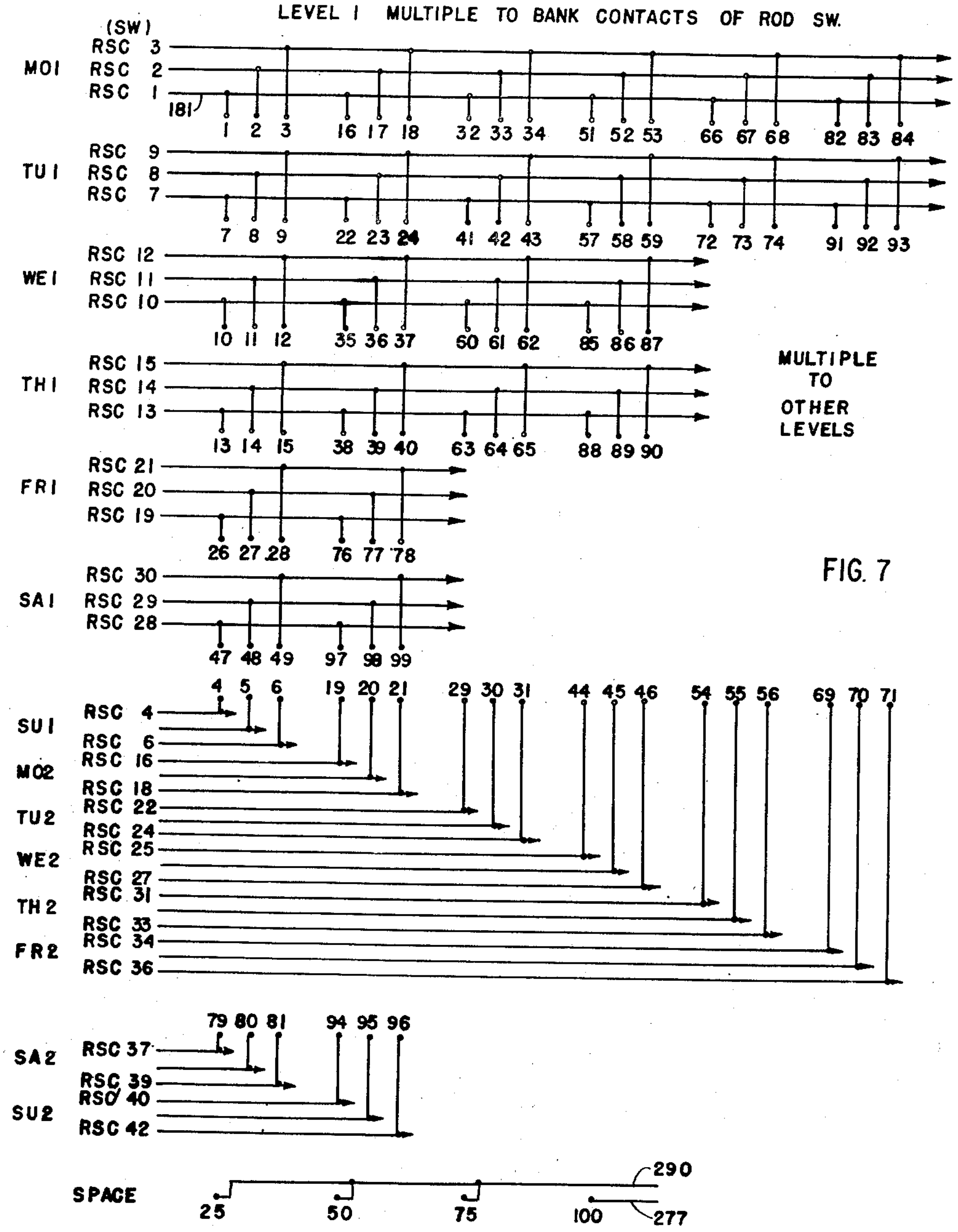
Fig. 7 shows the multiple connections in one level of the date switch to the scanning switches.

Fig. 7 shows all the bank contacts of the first level, or level 1, of the ROD date switch, their multiple connections, and connections to the motor magnets of all the scanning switches RSC. For example, contacts 1, 16, 32, 51, 66 and 82 are multipled to conductor 181 connected to motor magnet 130 of scanning switch RSC1 and is also multipled to contacts in other levels. Contacts 2, 17, 33, 52, 67 and 83 are multipled together and to the contacts in other levels and to the motor magnet of the second scanning switch RCS2.

Figure 8:
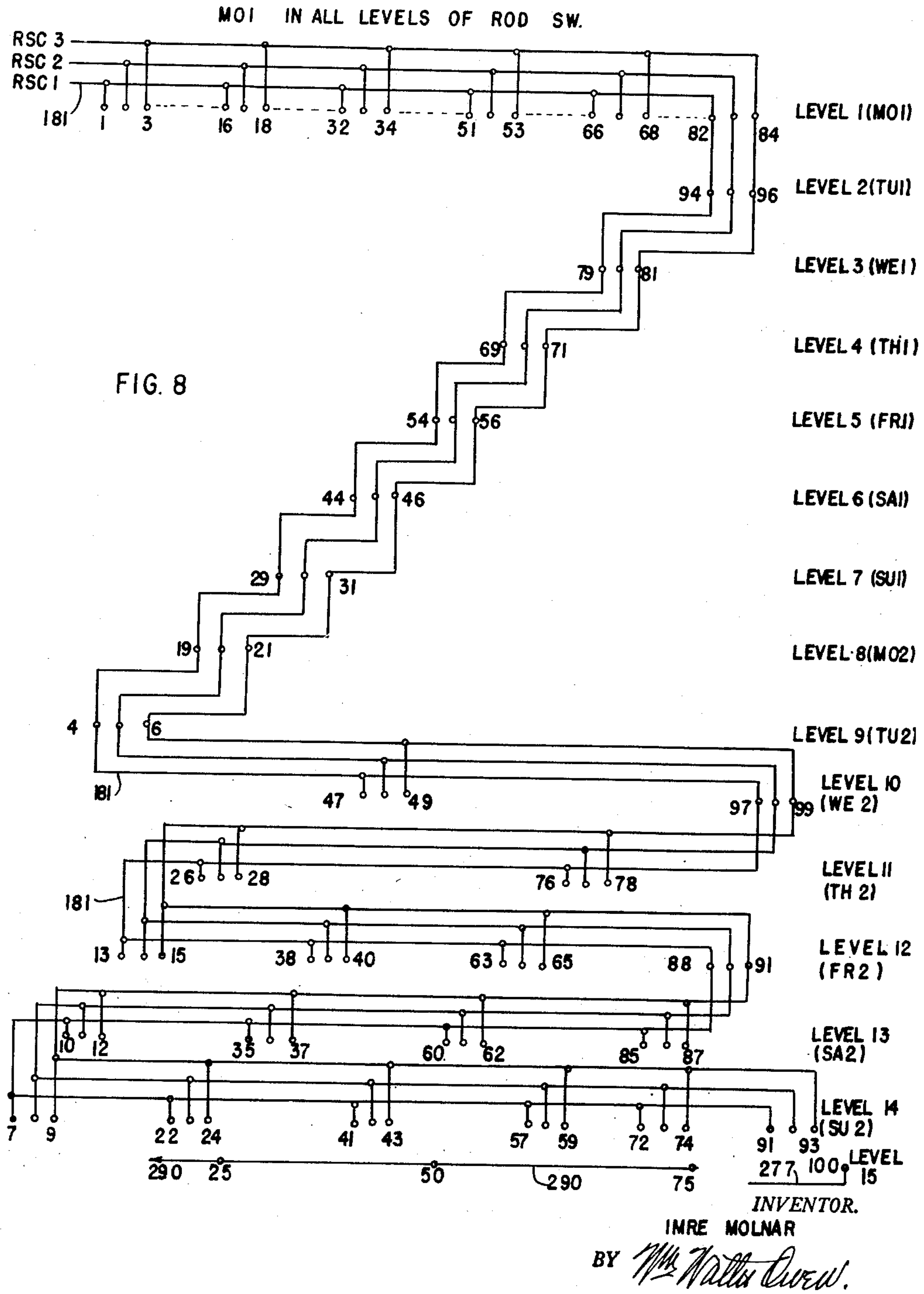
Fig. 8 shows the multiple connections in all levels of the date switch for one route group for one day of flight indicators.

Fig. 8 shows all of the multipled connections in all fourteen levels of the date switch ROD for the current day of the week, or Monday MO1. For example, the conductor 181 connected to the motor magnet 130 of scanning switch RSC is multipled to the 1st, 16th, 32nd, 51st, 66th and 82nd bank contacts in level 1 (MO1), to the 94th bank contact in level 2 (TU1), to one contact in levels 3 to 9, inclusive, to two contacts in levels 10 and 11, to four contacts in levels 12 and 13, and to six contacts in level 14. The conductors connected to the motor magnets of scanning switches RSC2 and RSC3 are similarly connected.

Figure 9:
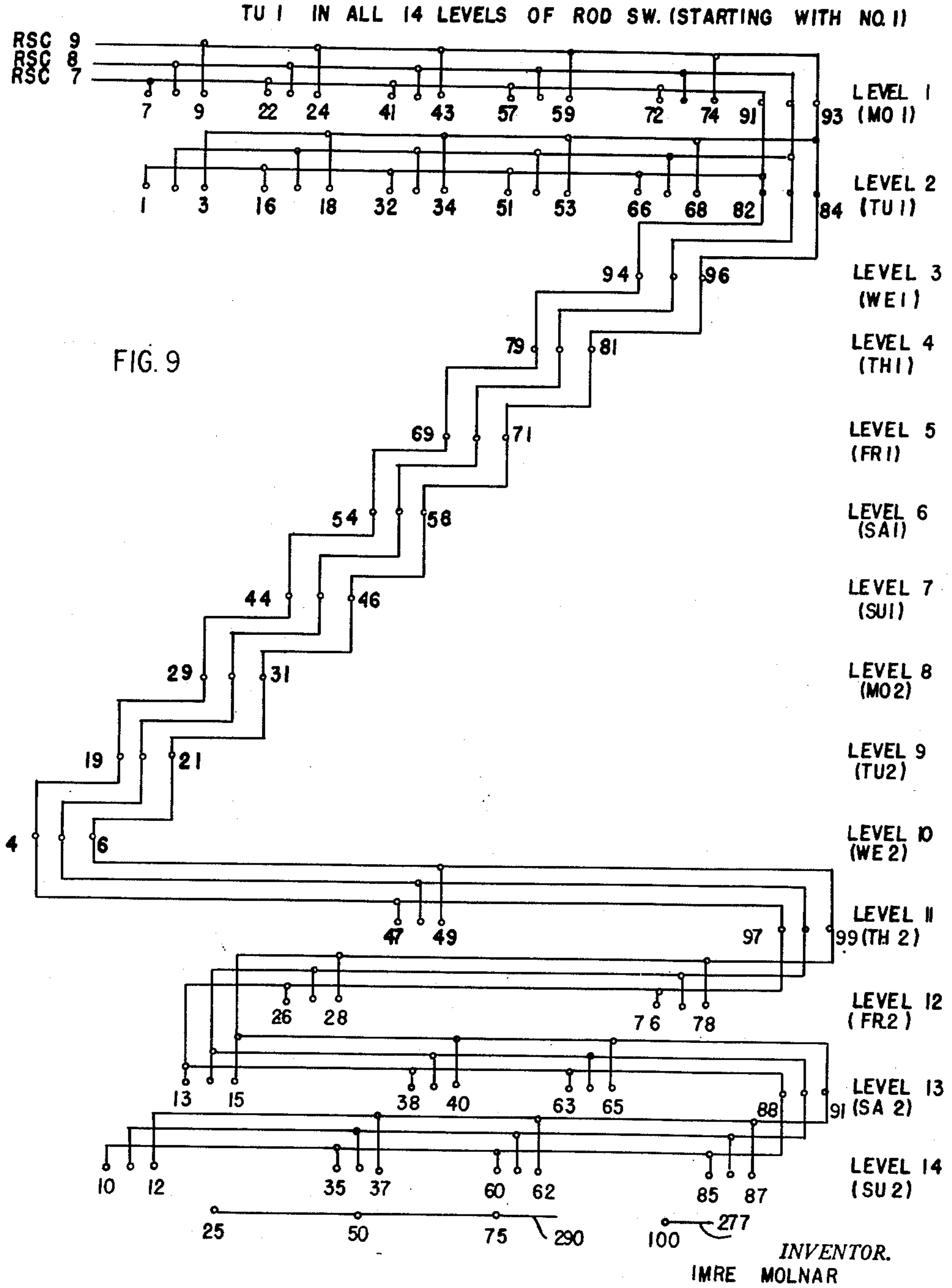
Fig. 9 shows the multiple connections in all levels of the date switch for one route group for another day of flight indicators.

Fig. 9 shows all the multiple connections in all fourteen levels of the date switch ROD for Tuesday TU1 and designates which contacts are connected to the motor magnets of the scanning switches RSC7, RSC8 and RSC9. The other designations WE1, etc., follow a pattern similar to that shown for MO1 and TU1 in Figs. 8 and 9.

Fig. 10 shows a completely printed bulletin printed by the "teletypewriter" on a partially preprinted sheet. The first horizontal row designates the initial starting point of a flight, the sectors, or stopping points or legs, and the destination of a given flight and the second horizontal row designates the numerical flight number and a code letter, such as E, D, T, or O, directly below each sector for designating in code the space available on each sector. For example, the letters CGMODMOH and flight number 101 in the first two horizontal rows designate that flight #101 from Chicago to Omaha comprises three sectors, or legs, the first leg being from Chicago to Moline, the second leg from Moline to Des Moines, and the third leg from Des Moines to Omaha. The letters in the first horizontal row and the flight numbers in the second horizontal row are preprinted. The printing of the code space letters, such as E and D in the second horizontal row are printed by the "teletprinter" under control of the apparatus shown in Figs. 1 and 2. The letter E designates that more than five seats are available for the corresponding leg of the flight, the letter D designates that there are from two to five seats available, the letter T designates that one seat is available, while the letter O designates no available seats. The first and second horizontal rows also show flights 103 and 105 with flight 103 being from Cleveland to San Francisco and having eleven sectors, or legs, while flight 105 from St. Louis to Seattle has four sectors, or legs. It will be noted that the preprinted sheet is divided into five vertical columns and if a given flight comprises more than five sectors, or legs, only the first five legs are in one column while the next five legs are in the next right hand column, etc. The reason for this spacing on the bulletin is due to the apparatus used for taking the readings on the indicators.

Before proceeding with the detail description of the present invention, it will be noted that the space computer indicators, one of which is shown in Fig. 1, are selected and then operated by impulses in the same manner as described in the Molnar patent mentioned above. That is, the desired set of five indicators is selected by the flight connector and impulses are transmitted thereto to set these indicators in accordance with the desired flight reservations under control of the reservation operators. The space computer indicator shown in Fig. 1 and the other selected indicators are operated by impulses transmitted over conductors, such as conductor 116, which are connected to the bank contacts of the flight connectors and the reset connectors.

The reset apparatus of the previously mentioned Molnar application is utilized by the supervisory operator to reset the indicators of a flight after the departure of such flight. That is, the supervisor operator controls the reset converter, the reset selector and the reset connector to select the indicators of this departed flight in order to change the setting of the indicators to conform to the seating capacity, or available space, of the same flight for a following day, in this instance for a day two weeks from the departed flight. The reset apparatus first causes all of the indicators of this flight to be restored to normal and then causes the indicators to be set in accordance with the seating capacity, or available space, of this flight. The respective indicators of this flight are now set in accordance with any previous reservations, each reservation subtracting one space from the remaining available space.

Each space indicator, or space computer indicator of the present invention, has a maximum capacity of eighty-nine spaces and if any flight has a capacity less than eighty-nine it is necessary to subtract a number of spaces so that the remaining spaces correspond to the available spaces, or seats, on the flight. For example, if a flight has a capacity of only twenty-five spaces then the reset converter steps the indicator from normal to its sixty-fourth position to indicate twenty-five available spaces after which each reservation is subtracted from the remaining available spaces.

*Reservation operation of space indicators*

The space computer indicator shown in Fig. 1 is shown as set in its 64th position; that is, it is in a position which indicates that there are twenty-five available seats in the plane for the leg of the journey which this indicator represents. The wipers of the tens switch T are in their eighth position while the wipers of the units switch U are in their fifth position. When the units switch wipers have made twenty-five steps and the tens switch wipers have made two steps from this position to their tenth positions in response to twenty-five reservations, the seating capacity of the plane for this leg of the journey is fully reserved. Battery impulses are transmitted over conductor 116 to the motor magnets 110 and 120 from either the connector or reset connector in the manner described in the previously mentioned Molnar application. For example, with the indicator in the position shown in Fig. 1 and if the reservation clerk desires to make a single reservation, an impulse is transmitted as follows: battery, conductor 116, left-hand winding of magnet 110, off-normal contacts 114 which are closed in position two to ten, right-hand winding of magnet 110 to ground. Motor magnet 110 is energized over this circuit and on termination of the reservation impulse the magnet deenergizes to step its wipers 111 and 112 into engagement with their sixth bank contacts. Since the off-normal contacts 113 are closed only in the first position of switch U the circuit to the motor magnet 120 of the tens switch T is not closed at this time. However, when enough reservation impulses have been transmitted over conductor 116 to position the wipers of the units switch U in their first position in engagement with their first bank contacts the off-normal contacts 113 are closed with the result that the next transmitted reservation impulse over conductor 116 now operates both motor magnets 110 and 120. Magnet 110 is now operated over conductor 116, left-hand winding of magnet 110, off-normal contacts 115 which are closed in only the first position of the units switch U, off-normal contacts 123 which are closed in positions two to ten of the tens switch T, and through the right-hand winding of magnet 110 to ground. Magnet 120 is operated by way of conductor 116, off-normal contacts 113 which are closed in only the first position of the unit switch U, and the winding of motor magnet 120 to battery. On termination of this impulse both magnets 110 and 120 deenergize. Magnet 110 steps its wipers to their second positions in engagement with their second bank contacts, opens off-normal contacts 113 and 115 and closes off-normal contacts 114. Magnet 120 steps its wipers 121 and 122 from its eighth bank contacts to engage its ninth bank contacts.

Further impulses continue to step the units switch U as described until it again reaches its first position whereupon a following impulse will again operate both motor magnets to cause both switches to step their wipers. Reservation impulses are transmitted to this indicator until all seats have been reserved.

It should be mentioned at this time that each space computer indicator is provided with two lamps, a green lamp G to indicate to the reservation clerk that one to four seats are available, a white lamp W to indicate that no seats are available as all reservations are taken, and when neither lamp is lighted it indicates to the reservation clerk that five or more seats are available for this sector of the flight. When more than five seats are available the wipers 112 and 122 do not close any circuits for either lamp. When there are from one to four remaining seats in this flight sector wiper 112 will be in engagement with one of the four multipled bank contacts, such as the sixth, seventh, eighth and ninth bank contacts and wiper 122 will be in engagement with its ninth bank contact. A circuit is now completed for lighting the green lamp G as follows: ground wiper 122 and its tenth bank contact, wiper 112 in engagement with one of the four multipled bank contacts, and green lamp G to battery. The illumination of the green lamp G in this indicator indicates to the reservation clerk that from one to four seats are available. When all the seats in this flight sector are reserved both wipers 112 and 122 are in engagement with their tenth bank contacts and the white lamp W is lighted over the following circuit: ground, wiper 122, tenth bank contact of the tens switch T, wiper 112 of the units switch U, tenth bank contact, and white lamp W to battery. The reservation clerk can, by observing the illuminated, or non-illuminated, condition of each indicator, determine if any seats are available for reservations in any desired flight sector.

*Reset operation of space indicators*

The space computer indicators are reset after the plane has departed on its scheduled flight in the manner described in the previously mentioned Molnar application. Briefly, the supervisory operator controls the reset converter, the reset selector and the reset connector to select the indicators of this departed flight. The reset apparatus then transmits a train of impulses over conductor 116 to operate the units and tens switches U and T until both the wipers of these switches are set in their first positions at which time the off-normal springs 113, 115 and 124 are closed. When the off-normal springs are closed the resistance in the impulsing circuit is reduced to enable a cut-off relay in the reset apparatus to be operated to stop further transmission of the resetting impulses. In explanation of this cut-off arrangement it will be observed that due to these off-normal contacts certain windings of the motor magnets 110 and 120 are included in the resetting impulsing circuit. For example, in positions two to ten of the units and tens switches U and T, the resetting impulsing circuit over conductor 116 includes only both windings of magnet 110 as off-normal contacts 113 and 115 are open and off-normal contacts 114 are closed. The right-hand winding of magnet 110 is of high resistance as compared to the left-hand winding. The total resistance in this circuit is too high to permit the operation of the cut-off relay in the reset apparatus. When the units switch U is in its first position and the tens switch T is in its second to tenth positions the high resistance winding of magnet 120 is connected over contacts 113 in parallel with a series circuit including both windings of magnet 110 which includes off-normal contacts 115 and 123. Due to the high resistance of the right-hand winding of magnet 110 and the high resistance winding of magnet 120 the total resistance in the resetting impulse circuit is too high to operate the cut-off relay in the reset apparatus. Therefore the reset apparatus continues to transmit impulses until both the units and tens switches simultaneously reach their first positions where the resistance in the resetting impulse circuit is lowered enough to cause the reset cut-off relay to operate. This circuit, with both switches in their first positions, includes only the low resistance left-hand winding of magnet 110 and the winding of magnet 120 in parallel over off-normal contacts 115 and 124 to ground and off-normal contacts 113, winding of magnet 120 to ground. Due to the substitution of ground at contacts 124 for the high resistance right-hand winding of magnet 110 the marginal cut-off relay in the reset apparatus operates to open the reset impulsing circuit. The indicator units and tens switches U and T have now been set to their normal positions, that is both switches in their first positions.

The supervisory operator now transmits a predetermined number of impulses over conductor 116 in order to set these indicators in accordance with the seating capacity of the plane for this flight sector. In case this particular flight has a capacity of twenty-five seats then the indicator switches receive enough impulses to set the wipers of these switches in positions so that twenty-five reservation impulses will set the wipers of both the units and tens indicator switches in engagement with their tenth bank contacts. The indicator switches U and T in Fig. 1 are shown in a position from which twenty-five reservations can be made.

After the supervisory operator has set the indicators to correspond to the seating capacity of the plane she then transmits a pulse over conductor 116 for each registration previously made for this flight, such previous registrations having been made more than two weeks ahead of such scheduled flight.

*Detail circuit operations*

Having described how the space computer indicators are operated, a detail description of the circuit operations for controlling "Teletype" printers to print code letters on the partially preprinted bulletins will now be given.

Assuming that the partially preprinted bulletins have been properly placed in the "Teletype" printers and when it is desired to print these bulletins, the bulletin clerk, or operator, will move the hand switch 291 to engage one of its terminals corresponding to the current day of the week. For example, if on the first Monday of a two-week period, the operator desires to print bulletins the hand switch 291 (Fig. 2) is moved to engage bank contact MO1 after which she will operate the start key STK.

Start key STK at contacts 242 grounds the motor start lead to start the "Teletype" distributor and printer motors and at contacts 243 closes a circuit for energizing the thermo relay BM over contacts 234. After an interval relay BM closes contacts 244 to energize start relay ST from ground at contacts 243. Start relay ST at contacts 231 disconnects ground from conductor 183 to open the restoring circuits of scanning switches RSC; at contacts 232 applies another ground to the distributor motor start lead; at contacts 233 completes a locking circuit for itself; at contacts 234 opens the circuit to the thermo relay BM which may now release; at contacts 235 completes a circuit for relay BP in series with interrupter I; at contacts 237 removes ground from conductor 195 to open the self-restoring circuit of switch RDK; at contacts 241 opens a point in the self-restoring circuit of switch RSH; at contacts 239 opens a point in the self-restoring circuit of switch ROD; and at contacts 238 closes a circuit for energizing thermo relay B1 over contacts 216 and for energizing the lower winding of pick-up relay PU over conductors 199 and 198 and contact 154. Thermo relay B1 will only operate and close its contacts 209 to ground the trouble alarm relay in case the pick-up relay PU fails to operate and open its energizing circuit at contacts 216. If for any reason the pulse relay BP operates and closes contacts 223 before the pick-up relay PU operates then the pick-up relay PU will not operate until the pulse relay BP restores because relay PU is differential and will not operate when both its windings are energized; the upper winding of relay PU being energized from ground over contacts 236, 223, 214 and 153 when relay BP operates before relay PU. Initial operation of relay BP before PU is without effect if such action occurs. This arrangement is provided so that a full impulse will be transmitted by relay BP for the coding operation only after the pick-up relay PU is operated.

Pick-up relay PU operates over the circuit traced through its lower winding. Relay PU at contacts 211 prepares a code pulsing circuit to relays PR, NR and RR; at contacts 212 prepares a circuit to the delay relay DA; at contacts 213 prepares a circuit to the clutch relay CL and relay SM; at contacts 214 opens the circuit to its upper winding; at contacts 216 opens the circuit to thermo relay B1 before it operates and closes contacts 209; and at contacts 215 closes a circuit for both trouble alarm time dash pot relays TA and TB. These dash pot relays are of the solenoid magnet type and only operate their associated contacts 217 or 218 after a predetermined time has elapsed.

When pulse relay BP is operated for a full pulse over interrupter I, contacts 223 close a circuit for energizing clutch relay CL and relay SM in multiple from ground at contacts 236, 223, 213, 206 to relay CL and battery and through the lower winding of relay SM to battery. Clutch relay CL operates before relay SM because relay SM has its upper winding short-circuited over contacts 205 of relay CL. Clutch relay CL operates contacts 220 to open the circuit to the clutch magnet of the distributor to permit one cycle operation of the distributor in the well-known manner. Clutch relay CL at contacts 205 opens the short-circuit around the upper winding of relay SM to allow this relay to operate and open the circuit to relay CL so that the latter relay will release and reclose the distributor clutch magnet thereby permitting only one cycle operation of the distributor. At contacts 222 relay BP closes a circuit for operating the carriage return relay CR and for energizing delay relay DA. The circuit for operating the carriage return relay CR may be traced as follows: ground, contacts 222 and 212, conductor 192, wiper 142 and last bank contact of switch RDK, conductor 175, wiper 244 and last bank contact of switch RSH, conductor 189, contacts 171, conductor 187, winding of relay CR to battery. A branch of this circuit extends by way of contacts 203 and conductor 191 to delay relay DA but this relay due to its copper slug, as indicated by its upper black end, is slow to operate with the result that relay CR operates before relay DA and at contacts 203 opens the energizing circuit to relay DA before it can fully operate.

At contacts 210 carriage return relay CR closes the circuit for operating the carriage return of the distributor in a well-known manner to properly position the teleprinter carriage for printing in the first vertical column. At contacts 204 relay CR closes a circuit for operating relay VB. Relay VB at contacts 201 closes a short-circuit around the lower winding of relay VA as well as a locking circuit for maintaining relay VB operated after relay CR releases.

Pulse relay BP restores when interrupter I terminates the impulse thereto and at contacts 222 terminates the pulse to relay CR which restores to open the carriage return circuit at contacts 210. Relay CR at contacts 203 again prepares the circuit to the delay relay DA and at contacts 204 opens the original energizing circuit of relay VB and also removes the short circuit from around the lower winding of relay VA. Relay VA is now operated and relay VB is maintained operated over ground contacts 202, 201, lower winding of relay VA and winding of relay VB to battery. Relay VA at contacts 171 opens the circuit to relay CR; at contacts 172 prepares a circuit for the line feed relay LS and step relay SC; and at contacts 173 prepares a locking circuit through its upper winding which is effective when the pulse relay BP is subsequently operated.

When pulse relay BP is again operated by the interrupter I relays CL and SM again operate over contacts 223 to cause the operation of the distributor clutch magnet as previously described. Line feed relay LS and step relay SC are now operated as follows: ground, contacts 222, 212, conductor 192, wiper 142 and tenth bank contact, conductor 175, wiper 244 and tenth bank contact, conductor 189, contacts 172, conductor 188, and through the windings of line feed relay LS and step relay SC to battery. Since relay CR is not operated during this pulse, delay relay DA is operated over contacts 203 after a slight delay. At contacts 161 delay relay DA prepares a point in the coding circuit which at this time is ineffective since the wipers of the switches RDK and RSC1 are in their normal positions as shown in Fig. 1. At contacts 162 relay DA extends the ground pulse through the winding of the motor magnet 140 to energize the same to position its stepping pawl preparatory to stepping the wipers of the RDK switch. Relay SC also at contacts 207 energizes the motor magnet 240 to prepare to step the wipers of the RSH switch and to short circuit time alarm dash pot relay TA to cause its release before it is fully operated. At contacts 208 step relay SC completes a circuit for energizing motor magnet 130 of scanning switch RSC1 as follows: ground, contacts 208, conductor 292, hand switch 291, bank contact MO1, wiper 1 of the date switch ROD and first bank contact, conductor 181, and winding of motor magnet 130 to battery. Magnet 130 energizes preparatory to stepping the wipers of the first scanning switch RSC1. Line feed relay LS closes contacts 200 to send a line feed pulse to the distributor to perform a line feed operation in the well-known manner to position the bulletin so that the teleprinter can print the first code letter E in the second horizontal line to the right of flight numeral 101 in the first five vertical columns shown in Fig. 10. At contacts 202 relay L3 opens the circuit of relays VA and VB whereupon relay VB restores while relay VA is maintained operated over its upper winding for the duration of the ground pulse over contact 222.

When the interrupter I restores pulse relay BP, relays SM, VA, LS, SC and DA and motor magnet 140 restore. When relay SC restores the circuits to motor magnets 240 and 130 are opened and these magnets restore. The restoration of magnet 140 steps wipers 141, 142 and 143 of switch RDK into engagement with their first bank contacts. The restoration of magnet 240 steps wiper 244 of switch RSH into engagement with its first bank contact and the restoration of magnet 130 steps the wipers 131–135, inclusive, into engagement with their first bank contacts. Off-normal contacts 242 of switch RSH now closes to prepare a self-restoring circuit for switch RSH. Off-normal contacts 137 of scanning switch RSC1 now closes to prepare a self-restoring circuit for this switch and at off-normal contacts 138 completes a circuit from ground over conductor 150 for operating slow to release relay KP. Relay KP at contacts 155 prepares a circuit for operating motor magnet 250 of the date switch ROD when the first scanning switch has completed one revolution back to its normal position. The switches are now in position to take the code reading of the first space computer indicator connected to the first bank contact accessible to wiper 131 of the first scanning switch RSC1.

When pulse relay BP is again operated relays CL and SM again operate over contacts 223 to cause the distributor to take one revolution; relay DA and motor magnet 140 are again energized over contacts 212 and relay DA at contacts 161 completes the code reading circuit for the first indicator over the following circuit: from positive pole of battery B1, low resistance L, high resistance H, multipled bank contacts of the tens switch T and its wiper 121, conductor 126, through the distributing frame DF over jumper 127, conductor 128, first bank contact of scanning switch RSC1 and its wiper 131, conductor 163, first bank contact of switch RDK and its wiper 141, winding of positive relay PR which is shorted by rectifier R1 blocking flow of current in this direction, through the rectifier R2 which is poled in the opposite direction thereby shorting negative relay NR when current flows in this direction, winding of relay RR, contacts 161, conductor 186, contacts 211 and 221 to the neutral conductor 184 which is connected to the midpoint of batteries B1 and B2. Positive relay PR alone energizes over the circuit because relay RR is marginal and will not operate when either the high resistance H or H' is connected in series therewith. Due to rectifier R1, positive relay PR will only operate when positive current from battery B1 is connected over wiper 141 and rectifier R2 will cause negative relay NR to operate only when negative current from battery B2 is connected to wiper 141. It should be here mentioned that relay SK is connected to a different battery other than batteries B1 and B2 and will not operate unless ground is connected to wiper 141.

Positive relay PR alone is energized over the above traced coding circuit and this relay at contacts 170 completes a circuit in the distributor for causing the teleprinters in this revolution to print the code letter E on the preprinted bulletin sheets shown in Fig. 10 to the right of the flight number 101 and directly below the letters MO in the first horizontal line comprising letters CGMODMOH.

When the first coding pulse is terminated by pulse relay BP restoring, relays SM, DA and PR and magnet 140 restore. Magnet 140 in restoring steps the wipers 141, 142 and 143 of reading switch RDK into engagement with their second bank contacts where wiper 142 prepares a circuit for operating space relay SP. Wiper 141 engages a dead contact so that no coding circuit is completed for relays PR, NR and RR on the next operation of pulse relay BP.

When pulse relay BP again operates relays CL, SM and DA and magnet 140 energize as previously described. In the even numbered positions of wiper 142 a circuit is completed for operating space relay SP as follows: Ground contacts 222, 212, conductor 192, wiper 142 in its second position and winding of space relay SP to battery. Relays CL and SM again cause the teleprinter to make one revolution while space relay SP at contacts 160 completes a circuit to cause the printer to take one horizontal step preparatory to printing the next code letter on the bulletin under the letters DM of the first horizontal line in Fig. 10.

When the spacing pulse is terminated by relay BP, relays SM and DA and magnet 140 restore and the wipers of the reading switch are stepped into engagement with their third bank contacts preparatory to code reading the second space computer indicator which is connected to the first bank contact accessible to wiper 132 of the first scanning switch RSC1.

Assuming that five or more seats are available in the next sector of flight 101, the second indicator will be in a position similar to that shown for the first indicator shown in Fig. 1, and when the pulse relay BP is operated for the second coding pulse, similar circuit operations as previously described take place to cause the teleprinter to print the code letter E directly below the letters DM of the first horizontal line in the bulletins as shown in Fig. 10. That is, relay PR is operated from positive battery B1 over the high resistance H, wiper 141, in engagement with its third bank contact and the neutral return lead to battery B1. The termination of the second coding pulse by relay BP causes the wipers of the reading switch RDK to advance to their fourth bank contacts where another spacing impulse is transmitted to the teleprinter as previously described by relays BP and SP; after which the wipers of switch RDK are advanced to engage their fifth bank contacts. When relay BP operates again the third space computer indicator is read over wiper 141, conductor 165, and wiper 133 to selectively operate the coding relays PR, NR or RR in accordance with the setting of the tens and units wipers of the third indicator.

Assuming that only from two to four seats are available in flight 101 in the third sector of the flight from Des Moines (DM) to Omaha (OH) then the tens wiper of the third indicator corresponding to wiper 121 would be in engagement with its tenth bank contact and the units wiper of the third indicator corresponding to wiper 111 would be in engagement with the three multipled sixth, seventh and eighth bank contacts. With the wipers of the third indicator in the positions just stated the high resistance H is by-passed and the coding circuit includes the positive pole of battery B1, low resistance L, the three multipled unit, bank contacts and wiper of the units switch, the tenth bank contact and wiper of the tens switch, distributing frame DF and jumper, the first bank contact engaged by wiper 133, conductor 165, fifth bank contact and wiper 141, relay PR, rectifier R2, marginal relay RR, contacts 161, 211 and 221 to the neutral battery lead 184 to battery B1. Since the high resistance H is by-passed in this circuit both relays PR and RR operate. The simultaneous operation of these two relays transmits over contacts 170 and 190 a code combination to cause the teleprinter to print the code letter D directly below the letters OH (Omaha) in the first horizontal line shown in Fig. 10. The code letter D indicates that from two to four seats are available in flight 101 from Des Moines to Omaha.

In case only one seat is available in flight 101 in the third sector of this flight, then the tens wiper of the third indicator corresponding to wiper 121 would be in engagement with its tenth bank contact and the units wiper of this third indicator corresponding to wiper 111 would be in engagement with its ninth bank contact. Under these conditions the coding circuit may be traced as follows: negative pole of battery B2, low resistance L', high resistance H', ninth bank contact and units wiper of the third indicator, tenth bank contact and tens wiper of the third indicator, terminals and jumper of distributing frame DF, first bank contact engaged by wiper 133, conductor 165, fifth bank contact and wiper 141, rectifier R1, winding of relay NR, relay RR, contacts 161, 211, 212, neutral lead 184 to the other pole of battery B2. Rectifier R1 passes current flow in this direction while rectifier R2 blocks such flow with the result that relay NR alone is energized in this circuit because marginal relay RR will not operate in series with high resistance H'. Negative relay NR at contacts 180 closes a circuit to the distributor to cause the teleprinter to print the code letter T indicating only one available seat in flight 101 from Des Moines to Omaha.

In case no seats are available in flight 101 in the third sector, or leg, of this flight, then the tens wiper of the third indicator corresponding to wiper 121 would be in engagement with its tenth bank contact and the units wiper of the third indicator corresponding to wiper 111 would be in engagement with its tenth bank contact. Under these conditions the coding circuit by-passes the high resistance H' and the coding circuit includes only the low resistance L' with the result that both relays NR and RR are operated over the coding circuit. Relays NR and RR at contacts 180 and 190 transmit a code combination to the distributor to cause the teleprinter to print the letter O indicating no available seats in flight 101 from Des Moines to Omaha.

After transmission of the third coding impulse and the third space pulse, the wipers of the code reading switch have advanced, as previously described, to engage their seventh bank contacts. Since flight 101 from Chicago to Omaha comprises only three sectors, or legs, Chicago to Moline, Moline to Des Moines, and Des Moines to Omaha, only three space computer indicators are assigned to this flight. Under these conditions the first bank contacts accessible to wipers 134 and 135 are jumpered through the distributing frame DF to ground. Therefore, when wiper 141 engages its seventh bank contact a circuit is completed for operating skip relay SK as follows: ground, terminals and jumper of the distributing frame DF, first bank contact and wiper 134, conductor 166, seventh bank contact and wiper 141, lower winding of skip relay SK to exchange battery. At contacts 151 and 152 relay SK closes a locking circuit for itself as follows: grounded contacts 152, multipled bank contacts and wiper 143, contacts 151 and the upper winding of relay SK to battery. A branch of this circuit extends through stepping magnet 140 to battery for energizing the same. At contacts 153 and 154 relay SK opens the circuit of the pick-up relay PU which restores. Magnet 140, upon energizing, at contacts 144 interrupts its own circuit and deenergizes to step the wipers of switch RDK to the next set of bank contacts. Relay SK is held operated and magnet 140 continues to interrupt its own circuit until the wipers of switch RDK are stepped to their tenth positions at which time the magnet self-interrupting circuit and the locking circuit of relay SK are opened. Relay SK restores and at contacts 153 and 154 restores the circuits for relay PU to reoperate relay PU over its lower winding as previously described.

The next full operation of pulse relay PB, following the reoperation of pick-up relay PU, again operates relays CL and SM at contacts 223, again operates delay relay DA and magnet 140 at contacts 222, and closes a circuit for operating tabulator relay TAB and stepping relay SC as follows: grounded contacts 222, 212, conductor 192, wiper 142 in engagement with its tenth bank contact, conductor 175, wiper 244 in engagement with its first bank contact, and windings of relays TAB and SC to battery. At contacts 230 tabulator relay TAB sends a tabulator code through the distributor to cause the teleprinter to make a tabulator operation in the well-known manner to cause the teleprinter to position the teleprinter carriage so that the next code letter will now be printed to the right of flight number 103 and directly below the code letters TL shown in the first horizontal line and in the second vertical column.

Flight #103 from Cleveland to San Francisco comprises eleven sectors, or legs, indicated by the pairs of coded letters, such as CV TL CG OH HX GI – NQ DV SL RP SZ — SF, in the first horizontal line and in the second, third and fourth vertical columns of Fig. 10. At contacts 207 relay SC energizes magnet 240 which again shorts trouble alarm dash pot relay TA at contacts 243 and relay SC at contacts 208 again operates magnet 130 of scanning switch RSC1. When relay BP restores to terminate the pulse, relays SM, DA, TAB and SC restore and magnet 140 restores to step the wipers of the reading switch RDK to engage their first bank contacts. Relay TAB in restoring opens the tabulator pulse to the distributor and relay SC in restoring restores magnets 240 and 130. Magnet 240 in restoring steps the wiper 244 to engage its second bank contact while the restoring of magnet 130 steps the wipers 131–135 of the first scanning switch to engage their second bank contacts which are cross connected through the distributing frame to the first five space computer indicators for flight 103.

These first five indicators of flight number 103 are tested and read by the stepping of the reading switch RDK as previously described to cause the teleprinter to print the code letters, such as D, D, T, T, and O, in the second horizontal line and to the right of the numeral 103 shown in Fig. 10. When reading switch RDK again engages its tenth bank contact, another tab code is sent through the distributor to position the carriage so that the next code letter, such as T, may be printed directly under the pair of code letters NQ (North Platte) as shown in Fig. 10; the wiper 244 is advanced to its third position; and the wipers of scanning switch RSC are advanced to their third positions where the third bank contacts are cross-connected through the distributing frame to the second set of five indicators assigned to flight 103. The polarity, high or low, code marking on these five indicators are now read by reading switch RDK in its odd position to selectively operate the coding relays PR, NR and RR in accordance with the available seats indicated respectively by the positions of each indicator. The coding relays transmitting the necessary coded pulses to the distributor to cause the printing of the corresponding code letters on the bulletin.

When the second five indicators of flight 103 have been scanned and have caused the code letters to be printed another tab operation takes place as previously described to position the carriage so that the next code letter may be printed under letters SF of the first horizontal line and fourth vertical column. Wiper 244 has been stepped to its fourth bank contacts and the wipers of the first scanning switch have been stepped to engage their fourth bank contacts which are connected through the distributing frame DF to the third set of indicators assigned to flight 103.

In this case, since flight 103 comprises only eleven sectors, or legs, and therefore only eleven indicators, only one indicator is included in the third set of indicators for flight 103. This last indicator is cross-connected to the fourth bank contact accessible to wiper 131 while the fourth bank contacts accessible to wipers 132, 133, 134 and 135 are connected through the distributing frame DF to ground to operate skip relay SK as previously described.

When the code letter E is printed directly below SF (San Francisco) and relay SK has operated switch RDK to its tenth position as previously described, another tab operation takes place to position the carriage so as to print the code letters for flight 105. The first scanning switch has been operated to engage its fifth set of bank contacts and the wiper 244 has been advanced to engage its fifth bank contact. In the same manner as previously described, the indicators of flight 105 are successively scanned by the reading switch RDK to operate the code relays in accordance with the available seating capacity remaining for the respective legs of flight 105, as indicated by the wiper positions of the tens and units switches of each indicator.

After the code letters have been printed in the fifth column and the wipers of switch RDK have been advanced to their tenth position, the next operation of pulse relay BP completes a circuit for operating the carriage return relay CR as follows: ground, contacts 222, 212, conductor 192, wiper 142 and its tenth bank contact, conductor 175, wiper 244 and its fifth bank contact, conductor 189, contacts 172, conductor 187 and relay CR to battery. Carriage return relay at contacts 210 causes a carriage return pulse to be transmitted to the distributor to cause the teleprinter to perform a carriage return so that the carriage will be moved to a position preparatory to the printing of the code letters for flight 109 in the fourth horizontal line in the first vertical column. Flight 109 is from Denver (DV) to San Francisco (SF) and comprises three sectors, or legs, as indicated by the pairs of letters DV OG SZ SF in the third horizontal row of Fig. 10. Relay CR at contacts 203 again opens the circuit to relay DA before it can fully operate and at contacts 204 again operates relay VB. Relay VB at contacts 201 again shorts relay VA and maintains itself operated after relay CR releases. When the relay BP restores relay CR restores to remove the short from relay VA thereby permitting relay VA to operate in series with relay VB. Relay VA at contacts 173 closes a locking circuit for its upper winding which is effective on the next operation of relay BP and at contacts 172 prepares a circuit for line feed relay LS and step relay SC.

When relay BP again operates, relays CL and SM operate and line feed relay LS and step relay SC operate. The circuit for operating relays LS and SC at this time includes wiper 244 and its fifth bank contact and contacts 172 of relay VA. At contacts 200 line feed relay LS transmits a code pulse through the distributor for causing the bulletin to be positioned so that the first code letter for flight 109 will be printed directly below letters OG of the third horizontal line and to the right of numeral 109 in the fourth horizontal line in the first vertical column of Fig. 10. Relay DA and magnet 140 also energize and relay SC also energizes magnets 240 and 130 as previously described. When relay BP restores relays LS, SC, SM and DA and magnet 140 restores to step wipers 141–143 to their first bank contacts. When relay SC restores magnets 240 and 130 restore to step the wiper 244 to its sixth bank contact and the wipers 131–135 to their sixth bank contact. Wipers 131, 132 and 133 have access to the three indicators assigned to flight 109 over their sixth bank contacts while the sixth bank contacts of wipers 134 and 135 are cross connected through the distributing frame to ground to cause the operation of skip relay SK as previously described. The setting of the three indicators for flight 109 are successively read in the manner previously described to control the coding relays to cause the teleprinter to print the code letters for flight 109 on the bulletin.

In the same manner as just described all of the indicators accessible over the wipers 131–135 of the first scanning switch RSC1 are successively scanned to cause the printing of the code letters, corresponding to the available seats remaining in each sector of a flight, on the bulletin. When the last indicator accessible to switch RSC1 has been read and the proper code printed on the bulletin the wipers 131–135 of the first scanning switch RSC1 are stepped into engagement with their fiftieth bank contacts or to their normal positions. In normal position off-normal contacts 137 and 138 open while contacts 139 close. At contacts 138 the circuit to relay KP is opened and relay KP, being a slow-to-release relay, maintains contacts 155 closed for a short interval. During this interval a circuit for energizing stepping magnet 250 of the date switch ROD is closed as follows: ground, off-normal contacts 139 and over a chain circuit including all forty-two of the scanning switches and their off-normal contacts, such as contacts 139', contacts 155, conductor 182, winding of magnet 250 to battery.

At contacts 252 magnet 250 completes a short circuit around the time relay TB. This short circuit is effective to restore the relay before it is fully operated if no circuit fault occurs in the previously described circuit operations. Relay TB is only fully operated if a failure occurs to ground the trouble alarm lead.

When relay KP restores this circuit is broken and magnet 250 restores to step the fifteen wipers of the date switch ROD to engage their second set of bank contacts. As is noted only one of these wipers 1 is effective at this time since the hand switch 291 is connected to only wiper 1. The circuit is now prepared for the stepping magnet of the second scanning switch RSC2 as illustrated in Fig. 4.

After the last indicator accessible to the first scanning switch RSC1 has been read and the code letter printed on the bulletin, the RDK and RSH switches are stepped to their tenth positions. The apparatus is now as shown in Figs. 1 and 2 with the exceptions that switch RSC2 is selected instead of switch RSC1 and relays ST and PU are operated. When relay BP next operates relays CR, CL, SM and VB operate in a now obvious manner to cause the printer to perform a carriage return operation. Relay VA also operates when the carriage return relay CR restores at the end of the pulse. On the following pulse operation of relay BP relays LS, SC, DA, CL, SM, and magnets 140, 240 and the stepping magnet of the second scanning switch RSC2 operate and at the end of this pulse these relays and magnets are restored and the respective switches step their wipers to engage their first bank contacts, while the line feed relay LS has caused the printer to perform a line feed operation, all in a manner similar to that previously described. Relay KP is again operated when off-normal contacts (not shown) of switch RSC2 steps from normal as follows: ground contacts 139 of the first scanning switch RSC1, operated off-normal contacts (not shown) of the second scanning switch, corresponding to contacts 138, conductor 150 and relay KP to battery.

The apparatus is now set to scan the indicators accessible to the second scanning switch RSC2 and to print the code letters on the bulletin in accordance with the available seats as determined by the tens and units wipers of these indicators. The reading and printing of the bulletin for the indicators accessible to scanning switch RSC2 is similar to that previously described. When all the indicators accessible to the switch RSC2 have been read and switch RSC2 is advanced to its normal position the circuit to relay KP is interrupted by its off-normal contacts and before relay KP restores a ground pulse is transmitted through contacts 155 for operating the stepping magnet 250 of the date switch to step the date switch wiper 1 to engage its third bank contact where the third scanning switch RSC3 is controlled to take the readings of the space indicators accessible thereto in a manner similar to that previously described. The date switch ROD is stepped one step after each selected scanning switch has completed one revolution. Fig. 7 diagrammatically illustrates the respective bank contacts of the first level and their multipled connections to the designated scanning switches. It will be noted that the scanning switch RSC1 is multipled to contacts 1, 16, 32, 51, 66 and 82 so that the indicators associated with scanning switch RSC1 are read six times during a complete revolution of the date switch ROD. The scanning switches RSC1, RSC2 and RSC3 have access to the space indicators corresponding to the various flights for the current day of the week which is today, or Monday, as designated MO1, and each of these switches are operated six times during one revolution of the date switch ROD when the first wiper thereof is actuated by the hand switch 291. In a manner apparent from Fig. 7 the number of times the remaining scanning switches are operated from this level is illustrated. That is, the scanning switches RSC7, RSC8 and RSC9 for the following day of the week, or Tuesday, designated TU1, are likewise operated six times, while the scanning switches RSC22, RSC23 and RSC24 for the second Tuesday of the week, designated TU2, are only operated once in this level.

Fig. 8 designates all of the multiple connections to the scanning switches RSC1, RSC2 and RSC3 for all fourteen levels of the date switch. As will be noted, when the hand switch 291 has been moved to select level 2, corresponding to Tuesday, (TU1) after all flights for Monday have departed, the scanning switches RSC1, RSC2 and RSC3 are only multipled once in this level, since MO1 now corresponds to a Monday two weeks from the just departed Monday flights. Fig. 9 is similar to Fig. 8 in that it shows all the Tuesdays TU1 multipling of the scanning switches RSC7, RSC8 and RSC9 in all fourteen levels. Fig. 6 shows a chart having fourteen vertical rows corresponding to the fourteen levels of the date switch ROD and the number of times the scanning switches for the respective days of the two week period are multipled in each level. As will be seen MO1 is multipled six times in the first level, or the first vertical row, in horizontal rows 1, 6, 11, 17, 22 and 27 and only once in the second level, or the second vertical row, in horizontal line 31.

Referring now to Fig. 2 it will be noted that the 25th, 50th and 75th bank contacts are multipled in order to automatically step the wipers of the date switch ROD one additional step to their next adjacent bank contacts. For example, when wiper 15 engages its 25th bank contact the following circuit is completed for stepping magnet 250: ground, wiper 15, bank contact 25 and multiple connections, conductor 290, off-normal springs 253 of the date switch, interrupter springs 251 and winding of magnet 250 to battery. Magnet 250 energizes over this circuit and near the end of its armature stroke operates contacts 251 to interrupt its own circuit whereupon magnet 250 de-energizes to step the wipers to the next bank contact.

The apparatus continues to print on the bulletins until all of the scanning switches RSC accessible from the first level of the date switch ROD have been operated as previously described and when the last accessible scanning switch has been operated and restored to normal the date switch ROD operates its wipers to engage their hundredth bank contacts. When wiper 15 of the ROD switch engages its hundredth bank contact slow-to-release relay B is energized over a circuit as follows: ground, wiper 15, 100th bank contact, conductor 277 and winding of slow-to-release relay B to battery. Relay B at contacts 274 completes an obvious circuit for operating relays CL and SM to cause the distributor clutch magnet to operate and make one revolution. Relay B completes a circuit for energizing relays S and PR as follows: from the positive pole of battery B1, conductor 174, winding of relay S, contacts 271, conductor 175, winding of relay PR, rectifier R2, relay RR, conductor 176, contacts 273, conductor 184 to the negative pole of battery B1. Due to the high resistance of relay S relay RR does not operate but relays PR and S operate to transmit a bell code character to the distributor by closing contacts 170 and 275. This bell code combination character causes the teleprinters to sound the bell thereat in the well-known manner to notify the printer attendant of the completion of this particular bulletin. At contacts 272 relay B completes a circuit for operating stepping magnet 250 of the date switch ROD as follows: ground, wiper 15, 100th bank contact, conductor 277, contacts 272, off-normal contacts 253, interrupter contacts 251 and winding of magnet 250 to battery. Magnet 250 positions its stepping pawl and near the end of its stroke opens its own circuit at contacts 251 whereupon the magnet 250 restores to step the wipers of the ROD switch to engage their first bank contacts and to open off-normal contacts 253. The ROD switch has now been restored to its normal position and the operator may either stop the further printing by restoring the start key STK or may continue the printing if desired.

The apparatus continues to print the bulletins in the manner described until the start key STK is restored. When start key STK is restored contacts 243 open the locking circuit of start relay ST which releases. At contacts 232 relay ST disconnects ground from the motor start lead of the Teletype distributor and printer, at contacts 231 grounds conductor 183 to restore any operated scanning switch, at contacts 235 opens the circuit to pulse relay BP, at contacts 236 opens the pulsing circuit to the clutch relay CL, at contacts 237 grounds conductor 195 to restore switch RDK to normal, at contacts 238 opens the circuit to relay PU which restores as well as the circuits to the time alarm relays TA and TB, at contacts 239 completes a self-restoring circuit for the date switch ROD, and at contacts 241 completes a restoring circuit for switch RSH. The operated scanning switch is restored to normal over the following circuit: ground, contacts 231, conductor 183, over the closed off-normal contacts, such as 137 or 137', of the operated scanning switch, through the interrupter springs, such as 136, and winding of the stepping magnet, such as 130, to battery. The stepping magnet of the operated scanning switch energizes and interrupts its own circuit at its interrupter contacts to step the wipers step-by-step until the wipers are restored to normal at which time the associated off-normal contacts, such as 137, open the stepping circuit. The circuit for restoring switch RDK to normal may be traced from ground, contacts 237, conductor 195, multipled bank contacts engaged by wiper 143, interrupter contacts 144 and stepping magnet 140 to battery. Magnet 140 energizes and interrupts its stepping circuit at contacts 144 to step the wipers of switch RDK until wiper 143 leaves the multipled bank contacts and comes to rest in its normal position as shown in Fig. 1. The circuit for restoring switch RSH to normal extends from ground, contacts 241, off-normal contacts 242, interrupter contacts 241 and magnet 240 to battery. Magnet 240 likewise at contacts 241 interrupts its own circuit to restore wiper 244 to normal at which time off-normal contacts 242 open the stepping circuit. A similar circuit for restoring the date switch ROD to normal extends from ground, contacts 239, off-normal contacts 253, interrupter contacts 251, and magnet 250 to battery. When the wipers of switch ROD respectively engage their first bank contacts off-normal contacts 253 open the stepping circuit of magnet 250. The apparatus is now restored to normal.

After the operator has printed the bulletins for Monday, MO1, and has restored the start key STK to restore the apparatus to normal, the hand switch 291 may be manually moved by the operator to select any day of the two week period and then operate the start key STK to cause the bulletins for this selected day to be printed in a manner apparent from the foregoing description.

Returning now to the trouble alarm circuits, the dashpot relays TA and TB are solenoid operated relays of the type shown in the H. H. Harbecke Patent 1,556,599 issued October 13, 1925, in which the relay is slowly operated but quickly released. Relay BI is of the usual thermal type bi-metal relay which is only operated in case of pulsing trouble in which the master pulse fails to operate relay BP and pick-up relay PU fails to operate. Contacts 209, in this type of trouble, would close after an interval to ground the trouble alarm lead and sound, or operate, an alarm. Time-alarm relay TA is timed to operate its contacts 218 only in case the RSH switch fails to step periodically which indicates equipment trouble up to and including the operation of relay SC. Relay TA is never fully operated if the equipment functions properly and is quickly restored to normal each time magnet 240 operates to short circuit relay TA. However, if for some reason, switch RSH fails to operate periodically the relay TA will have sufficient time to fully operate and close contacts 218 to operate the alarm. Time relay TB is fully operated only in case the date switch ROD is not operated periodically which is a general supervision of the over-all functioning of the complete system. The relay TB is quickly restored each time the stepping magnet 250 of the date switch operates to short-circuit the winding of relay TB and this relay is never operated when the apparatus functions properly. Relay TB at contacts 217 also grounds the trouble alarm lead in case the date switch ROD fails to step.

What is claimed is:

1. In a space reservation system, a plurality of space indicators corresponding to a plurality of routes for a plurality of consecutive days, said indicators divided into route groups, each route group corresponding to a particular route for one of said days and containing as many indicators as there are stopping points enroute, and each indicator being individual to a corresponding portion of its route, means for arranging all said indicators in a date group with the route groups corresponding to the current day appearing a predetermined number of times in said date group and the route groups corresponding to subsequent days appearing progressively less frequent in said date group, means for selectively operating each said indicator in accordance with the remaining available space for its portion of its route, means for code marking each of said indicators in accordance with the remaining available space for its portion of its route, means for successively scanning the code marking means of all the indicators in said date group in the order arranged by said date group arranging means whereby said current day route groups are scanned more frequently than said subsequent day route groups, code responsive means controlled by said successive scanned code marking means of the successively scanned indicators for transmitting coded pulses in accordance with said successive scanned code markings, and receiving means responsive to said transmitted coded pulses for printing bulletins to indicate in code the available space in each portion of its route, the code printing for said current day route groups being printed more frequently than said subsequent day route groups in accordance with said date group arranging means.

2. In a space reservation system as claimed in claim 1 wherein said scanning means includes a plurality of scanning switches having access to said indicators and said date group arranging means includes a date switch having access to said scanning switches in the order arranged by said date group arranging means, and means for activating said scanning switches in said date group order from said date switch.

3. In a space reservation system as claimed in claim 1 wherein said code marking means for each indicator includes potential markings of different polarities and resistance values and means for selectively connecting one of said potential markings to said scanning means in accordance with the remaining available space indicated in each such indicator, conductors extending from said scanning means to said code responsive means for connecting said potential markings to said code responsive means, and said code responsive means including coding relays selectively operable in accordance with said different polarities and resistance values of said scanned potential markings to transmit said coded pulses to said receiving means.

4. In a space reservation system as claimed in claim 1 wherein said code responsive means includes a code reading switch and coding relays controlled by said successive scanned code markings of said indicators.

5. In a space reservation system as claimed in claim 1 wherein said scanning means includes a plurality of scanning switches having access to said indicators and said code responsive means includes a code reading switch having access to said scanning switches and includes coding relays controlled by said successive scanned code markings of said indicators, and means for operating said scanning switches in the order arranged by said date group arranging means.

6. In a space reservation system as claimed in claim 1 including a date switch having a plurality of levels of bank contacts and a cooperating wiper for each of said levels and each level corresponding to a different calendar day, said date group arranging means comprising one of said levels of bank contacts, its cooperating wiper and conductors connecting said scanning means to said one level of bank contacts in said date group order, said conductors also connecting said scanning means to the other levels of bank contacts of said date switch in different date group orders, means for operating all the wipers of said date switch over their respective levels of bank contacts, and means for selectively activating only one of said date switch wipers during operation thereof to thereby activate the corresponding level of bank contacts to operate the scanning means in the date group order said conductors are connected to said activated level.

7. In a space reservation system as claimed in claim 1 wherein said scanning means includes a plurality of scanning switches having access to said indicators and said date group arranging means includes a date switch having access to said scanning switches in the order arranged by said date group arranging means, means for activating said scanning switches in said date group order from said date switch, and means controlled from said date switch and operable after operation of the last activated scanning switch in said date group for controlling said coding means to transmit a code signal to said receiving means to indicate completion of said date group.

8. In a space reservation system, a plurality of space indicators corresponding to a plurality of routes, said indicators arranged in route groups, each route group corresponding to a particular route and containing as many indicators as there are stopping points enroute, and each indicator being individual to a corresponding portion of its route and having as many positions as the number of available spaces in its portion of its route; code marking means in each of said indicators comprising coded potential markings of different polarities and resistance values, the potential markings designating five or more available spaces comprises positive polarity with a high resistance value, the potential markings designating two to four available spaces comprises positive polarity with a low resistance value, the potential markings designating one available space comprises negative polarity with a high resistance value, the potential markings designating no available spaces comprises negative polarity with a low resistance value, and means connecting said marking potentials to corresponding positions of said indicators; means for selectively operating each said indicator to one of its positions in accordance with the remaining available space for its portion of its route, scanning switches having access to said indicator for scanning said potential markings of said indicators, said scanning switches arranged in route groups corresponding to said indicator route groups, a date switch connected to said scanning switches in a predetermined order for activating said scanning switches in said predetermined order, a pulse sender and means for operating said sender to transmit pulses, means responsive to said pulses for operating said scanning switches in said predetermined order activated by said date switch to successively scan said indicators for said potential markings in the same route order as said predetermined order, receiving means, and code responsive means connected to all said scanning switches responsive to said successive scanned potential markings for transmitting successive coded pulses to said receiving means to indicate the available space indicated on each of said indicators.

9. In a space reservation system, a plurality of space indicators operable to indicate the available space in a plurality of routes, said indicators divided into groups of a predetermined number, a plurality of scanning switches, each scanning switch having a plurality of wipers corresponding to said predetermined number, bank contacts accessible to said wipers, scanning conductors individually connecting said bank contacts to said indicator, multiple connections corresponding in number to said predetermined number respectively connecting corresponding wipers of each scanning switch, a sequence switch having a wiper, bank contacts in said sequence switch corresponding in number to said predetermined number respectively terminating said multiple connections, a date switch having a wiper and bank contacts, an operating magnet for each said scanning switch, operating conductors respectively connecting said magnets to said date switch bank contacts in a predetermined order, means for repeatedly operating each of said scanning switch magnets over its operating conductor to step its wipers to successively engage all its bank contacts and for sequentially operating said scanning switches over said date switch wiper in said predetermined order said operating conductors are connected to said date switch bank contacts, means for operating the wiper of said sequence switch to successively engage all its said bank contacts after each of said scanning switch magnet operations to repeatedly and successively connect said sequence switch wiper to said multiple connections over its bank contacts, a series circuit completed each time said sequence switch wiper engages one of its said bank contacts; each series circuit including a different one of said scanning conductors, a different one of said scanning switch bank contacts and its cooperating wiper, one of said multiple connections, one of said sequence switch bank contacts, and said sequence switch wiper; coded potential markings in each said indicator corresponding to the available space indicated in each indicator connected to its corresponding scanning conductor, code responsive means connected to said sequence switch wiper responsive to the code markings of each said completed series circuit for transmitting coded pulses corresponding to said coded markings, and receiving means operated by said coded pulses.

10. In a space reservation system, a plurality of space indicators for indicating available space on routes for a plurality of consecutive days, said indicators being divided into day groups and each day group sub-divided into route groups whereby each route group corresponds to a particular one of said routes for a particular one of said days, scanning switches having access to said indicators, a date switch having a plurality of wipers corresponding to said consecutive days, a level of bank contacts accessible to each of said wipers, an operating conductor for each scanning switch, multiple connections of each said conductor terminating in the bank contacts of all said levels and the operating conductors of the scanning switches having access to the indicator route groups for the current one of said days being multipled to a predetermined number of said bank contacts in the level corresponding to said current day and the operating conductors of the scanning switches having access to the indicator route groups for subsequent days being progressively multipled less frequently to a progressively lesser number of bank contacts in the levels corresponding to said subsequent days, means for selectively activating one of said wipers to operatively condition the operating conductors and multiple connections terminating in the corresponding level of bank contacts, means for operating each of said scanning switches over its operatively conditioned operating conductor and said activated wiper to scan the indicators accessible thereto, and means for operating the wipers of said date switch to engage their next bank contacts after completion of each scanning switch operation to operate said scanning switches in the order corresponding to the sequential connections of said multiple connections of said operating conductors to the level of bank contacts engaged by said activated wiper.

11. In a space reservation system as claimed in claim 10 including a sequence switch having a scanning conductor multipled to all of said scanning switches, and means for operatively associating said scanning conductor with said indicators over only one of said scanning switches at a time in response to the initial movement of said one scanning switch.

12. In a space reservation system as claimed in claim 10 wherein each scanning switch includes a normal position, off-normal contacts, and a plurality of scanning switches and each complete operation of a scanning switch includes the movement of each scanning switch from its normal position through its scanning position back to its normal position to operate said off-normal contacts, and said means for operating the wipers of said date switch includes said off-normal contacts and means controlled by said off-normal contacts.

13. In a reservation system, a bulletin having flight numbers and destination abbreviations for each flight number preprinted thereon, each flight number corresponding to a flight including a starting destination point, intermediate stopping destination points, and a terminating destination point and each destination abbreviation corresponding to one of said destination points, a printer for printing on said bulletin, a plurality of indicators, there being an indicator for each portion of each flight from one destination point to the next succeeding destination point in each flight, blank flight spaces on said bulletin for each said preprinted flight number and its preprinted destination abbreviations, there being a blank flight space individual to each said indicator, means for operating each said indicator to indicate the number of available remaining seats in its portion of its flight, means for scanning successive indicators of a flight for said available number indications, and means for operating said printer to print coded indications corresponding to said available number indications of said scanned indicators on said bulletin in the blank flight spaces individual to each scanned indicator and corresponding to said destination abbreviations and said flight numbers.

14. In a reservation system as claimed in claim 13 wherein said preprinted flight numbers and said preprinted destination abbreviations are arranged in a predetermined order on said bulletin, and means whereby said scanning means have access to said indicators in the same predetermined order.

References Cited in the file of this patent

UNITED STATES PATENTS

| Number | Name | Date |
|---|---|---|
| 1,877,635 | Antoniono | Sept. 13, 1932 |
| 2,444,202 | McAlpine | June 29, 1948 |
| 2,475,848 | May | July 12, 1949 |